US009866796B2

(12) United States Patent
Shimoyama

(10) Patent No.: US 9,866,796 B2
(45) Date of Patent: Jan. 9, 2018

(54) IMAGING APPARATUS, IMAGING METHOD, AND COMPUTER-READABLE RECORDING MEDIUM

(71) Applicant: Olympus Corporation, Shibuya-ku, Tokyo (JP)

(72) Inventor: Junichi Shimoyama, Hachioji (JP)

(73) Assignee: Olympus Corporation, Tokyo (JP)

( * ) Notice: Subject to any disclaimer, the term of this patent is extended or adjusted under 35 U.S.C. 154(b) by 347 days.

(21) Appl. No.: 14/623,339

(22) Filed: Feb. 16, 2015

(65) Prior Publication Data

US 2015/0163457 A1   Jun. 11, 2015

Related U.S. Application Data

(63) Continuation of application No. PCT/JP2014/068709, filed on Jul. 14, 2014.

(30) Foreign Application Priority Data

Aug. 27, 2013   (JP) .................................. 2013-175877

(51) Int. Cl.
  *H04N 7/18* (2006.01)
  *H04N 5/232* (2006.01)
  (Continued)

(52) U.S. Cl.
  CPC ........... *H04N 7/18* (2013.01); *H04N 5/23216* (2013.01); *H04N 5/23222* (2013.01);
  (Continued)

(58) Field of Classification Search
  CPC ........... H04N 5/23216; H04N 5/23222; H04N 5/772; H04N 5/907; H04N 9/8205; H04N 5/23293; H04N 7/18
  (Continued)

(56) References Cited

U.S. PATENT DOCUMENTS

2004/0218916 A1   11/2004   Yamaguchi
2005/0264669 A1   12/2005   Ota
(Continued)

FOREIGN PATENT DOCUMENTS

JP   2004-294498   10/2004
JP   2005-051472   2/2005
(Continued)

OTHER PUBLICATIONS

Notification of Transmittal of International Search Report and Written Opinion of International Search Authority (2 pgs.), International Search Report (3 pgs.) and Written Opinion of International Search Authority (3 pgs.) for PCT/JP2014/068709.

*Primary Examiner* — Sath V Perungavoor
*Assistant Examiner* — Peet Dhillon
(74) *Attorney, Agent, or Firm* — John C. Pokotylo; Pokotylo Patent Services

(57) ABSTRACT

An imaging apparatus includes: an imaging unit that generates image data containing a subject image; a part dividing unit that divides the subject image into a plurality of parts; a changed-image data generating unit; a display control unit that allows a display unit to display an avatar image; a touch panel that accepts a user operation that changes a positional relationship between a plurality of resions contained in the avatar image; a positional relationship storage unit that stores positional relationship information related to the positional relationship between the plurality of resions changed according to the user operation; and an imaging control unit that allows a recording unit to record the image data, based on the positional relationship information and a positional relationship between the plurality of parts.

6 Claims, 16 Drawing Sheets

(51) Int. Cl.
  *H04N 5/77*    (2006.01)
  *H04N 5/907*   (2006.01)
  *H04N 9/82*    (2006.01)

(52) U.S. Cl.
  CPC ............ *H04N 5/772* (2013.01); *H04N 5/907* (2013.01); *H04N 9/8205* (2013.01); *H04N 5/23293* (2013.01)

(58) Field of Classification Search
  USPC .......................................................... 348/77
  See application file for complete search history.

(56) References Cited

U.S. PATENT DOCUMENTS

| | | | |
|---|---|---|---|
| 2011/0234854 A1 | 9/2011 | Kimura | |
| 2012/0275648 A1* | 11/2012 | Guan ................ | H04N 5/23219 382/103 |
| 2014/0002449 A1* | 1/2014 | Lu .......................... | G06T 13/40 345/419 |
| 2015/0042663 A1* | 2/2015 | Mandel .................... | G06N 5/02 345/474 |

FOREIGN PATENT DOCUMENTS

| | | |
|---|---|---|
| JP | 2005-339363 | 12/2005 |
| JP | 2005-347886 | 12/2005 |
| JP | 2010-068180 | 3/2010 |
| JP | 2011-113135 | 6/2011 |
| JP | 2011-211438 | 10/2011 |
| JP | 2012-073512 | 4/2012 |
| JP | 2012-239156 | 12/2012 |

* cited by examiner

FIG.4

| PAIR OF ADJACENT PARTS | FIXED PART | POSITION CHANGE PART |
|---|---|---|
| HEAD PART AND CHEST PART | CHEST PART | HEAD PART |
| CHEST PART AND UPPER LOWER BACK PART | UPPER LOWER BACK PART | CHEST PART |
| UPPER LOWER BACK PART AND LOWER LOWER BACK PART | LOWER LOWER BACK PART | UPPER LOWER BACK PART |
| LOWER LOWER BACK PART AND LEFT UPPER KNEE PART | LOWER LOWER BACK PART | LEFT UPPER KNEE PART |
| LOWER LOWER BACK PART AND RIGHT UPPER KNEE PART | LOWER LOWER BACK PART | RIGHT UPPER KNEE PART |
| LEFT UPPER KNEE PART AND LEFT LOWER KNEE PART | LEFT UPPER KNEE PART | LEFT LOWER KNEE PART |
| RIGHT UPPER KNEE PART AND RIGHT LOWER KNEE PART | RIGHT UPPER KNEE PART | RIGHT LOWER KNEE PART |
| CHEST PART AND LEFT UPPER ELBOW PART | CHEST PART | LEFT UPPER ELBOW PART |
| CHEST PART AND RIGHT UPPER ELBOW PART | CHEST PART | RIGHT UPPER ELBOW PART |
| LEFT UPPER ELBOW PART AND LEFT LOWER ELBOW PART | LEFT UPPER ELBOW PART | LEFT LOWER ELBOW PART |
| RIGHT UPPER ELBOW PART AND RIGHT LOWER ELBOW PART | RIGHT UPPER ELBOW PART | RIGHT LOWER ELBOW PART |

FIG.7
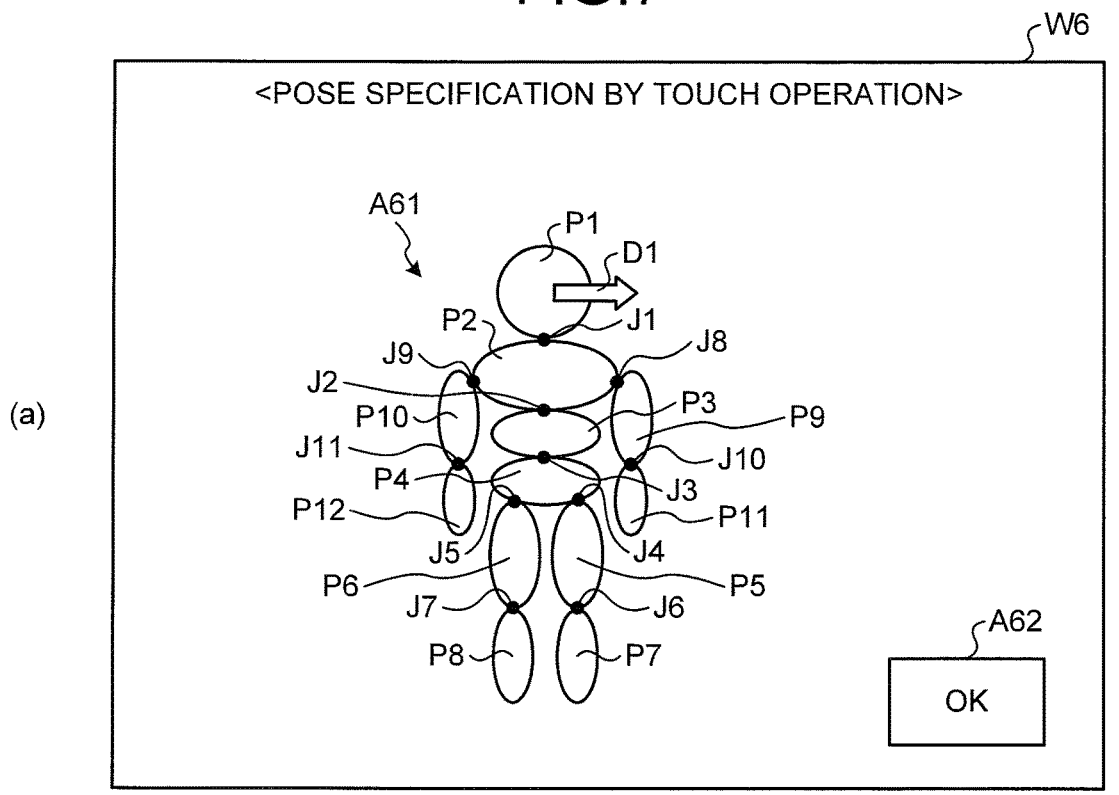
(a)
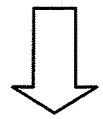
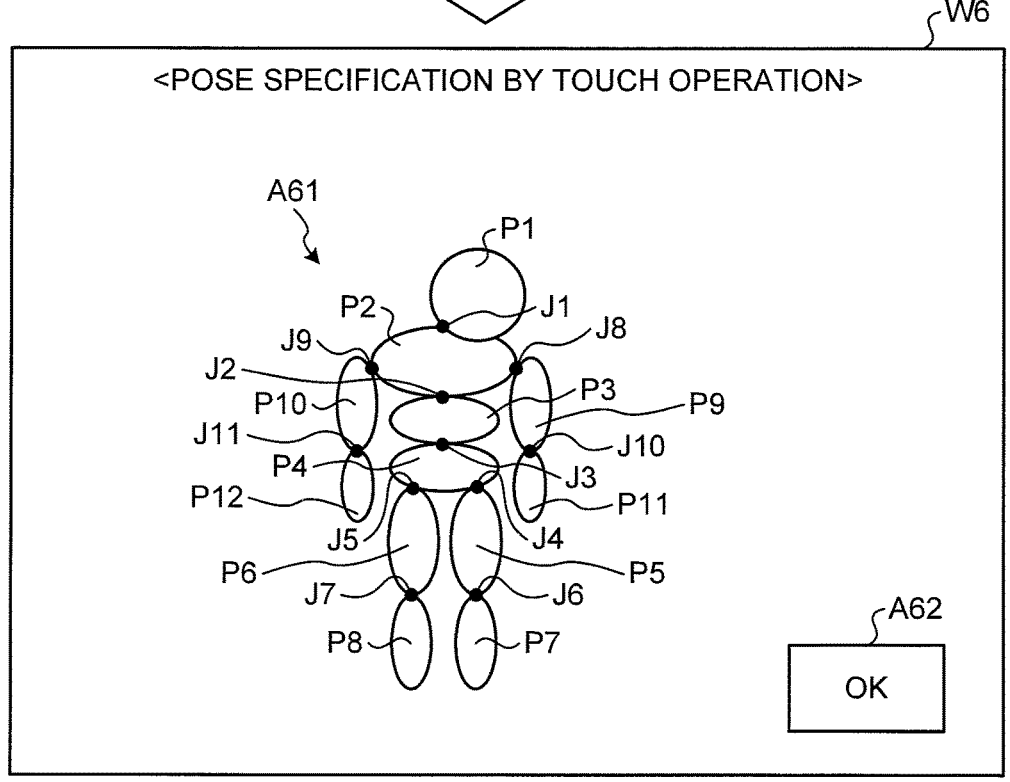
(b)

IMAGING APPARATUS, IMAGING METHOD, AND COMPUTER-READABLE RECORDING MEDIUM

CROSS REFERENCES TO RELATED APPLICATIONS

This application is a continuation of PCT international application Ser. No. PCT/JP2014/068709 filed on Jul. 14, 2014 which designates the United States, incorporated herein by reference, and which claims the benefit of priority from Japanese Patent Application No. 2013-175877, filed on Aug. 27, 2013, incorporated herein by reference.

BACKGROUND

1. Technical Field

The present invention relates to an imaging apparatus, an imaging method, and a computer-readable recording medium.

2. Related Art

In recent years, there are known techniques in which a special effect process (image processing) is performed on image data containing a subject image in an imaging apparatus such as a digital camera or a digital video camera, to meet various user demands (see Japanese Patent Application Laid-open No. 2005-347886).

The technique is a technique for generating special effect image data by performing special effect processes, such as wipe and sepia, on image data containing a subject image.

SUMMARY

In accordance with some embodiments, an imaging apparatus, an imaging method, and a computer-readable recording medium are presented.

In some embodiments, an imaging apparatus includes: an imaging unit that captures a subject to generate image data containing a subject image; a part dividing unit that analyzes the image data and divides the subject image into a plurality of parts using position information related to a joint or a junction between bones; a changed-image data generating unit that generates changed-image data in which a positional relationship between the plurality of parts is changed; a display unit; a display control unit that allows the display unit to display an avatar image representing the subject; a touch panel that accepts a user operation that changes a positional relationship between a plurality of resions contained in the avatar image; a positional relationship storage unit that stores positional relationship information related to the positional relationship between the plurality of resions changed according to the user operation; and an imaging control unit that allows a recording unit to record the image data, based on the positional relationship information and the positional relationship between the plurality of parts obtained by analyzing and dividing the image data by the part dividing unit.

In some embodiments, an imaging method includes: capturing a subject to generate image data containing a subject image; analyzing the image data thereby dividing the subject image into a plurality of parts using position information related to a joint or a junction between bones; generating changed-image data in which a positional relationship between the plurality of parts is changed; displaying an avatar image representing the subject; storing, according to a user operation that changes a positional relationship between a plurality of resions contained in the avatar image, positional relationship information related to the changed positional relationship between the plurality of resions; and allowing a recording unit to record the image data, based on the positional relationship information and the positional relationship between the plurality of parts.

In some embodiments, a non-transitory computer-readable recording medium is a recording medium with an executable program stored thereon. The program instructs an imaging apparatus to perform: capturing a subject to generate image data containing a subject image; analyzing the image data thereby dividing the subject image into a plurality of parts using position information related to a joint or a junction between bones; generating changed-image data in which a positional relationship between the plurality of parts is changed; displaying an avatar image representing the subject; storing, according to a user operation that changes a positional relationship between a plurality of resions contained in the avatar image, positional relationship information related to the changed positional relationship between the plurality of resions; and allowing a recording unit to record the image data, based on the positional relationship information and the positional relationship between the plurality of parts.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of the setting information recorded in the flash memory illustrated in FIG. 2;

FIG. 7 is a diagram illustrating a screen transition of a menu screen displayed by the display unit when the menu switch illustrated in FIG. 2 is operated;

DETAILED DESCRIPTION

Modes (hereinafter, embodiments) for carrying out the present invention will be described below with reference to the drawings. Note that the present invention is not limited to the embodiments described below. Furthermore, in the description of the drawings, the same portions are denoted by the same reference signs.

First Embodiment

Schematic Configuration of an Imaging Apparatus

Figure 1:
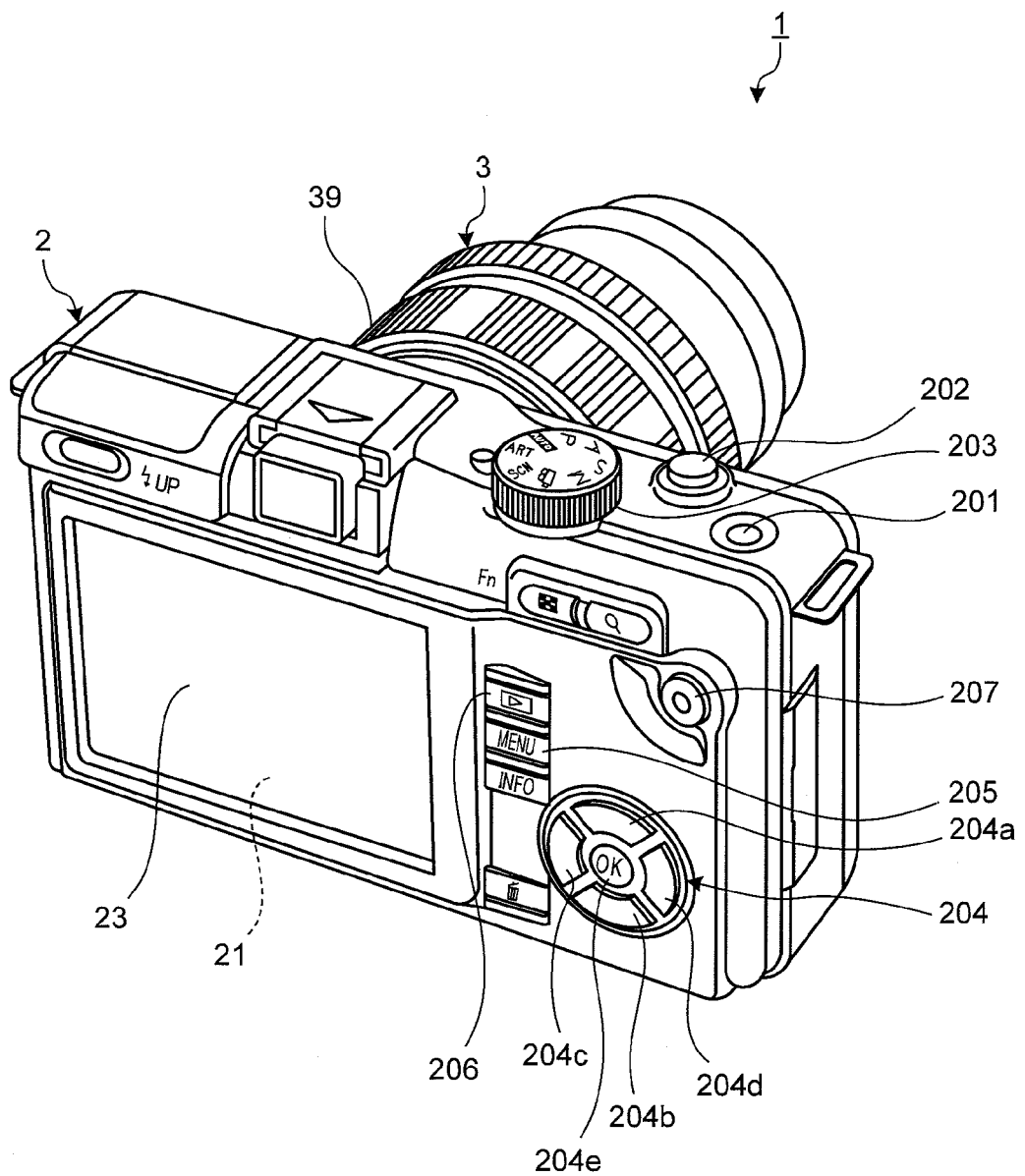
FIG. 1 is a perspective view illustrating a configuration of a side of an imaging apparatus facing a user, according to a first embodiment of the present invention.
Figure 2:
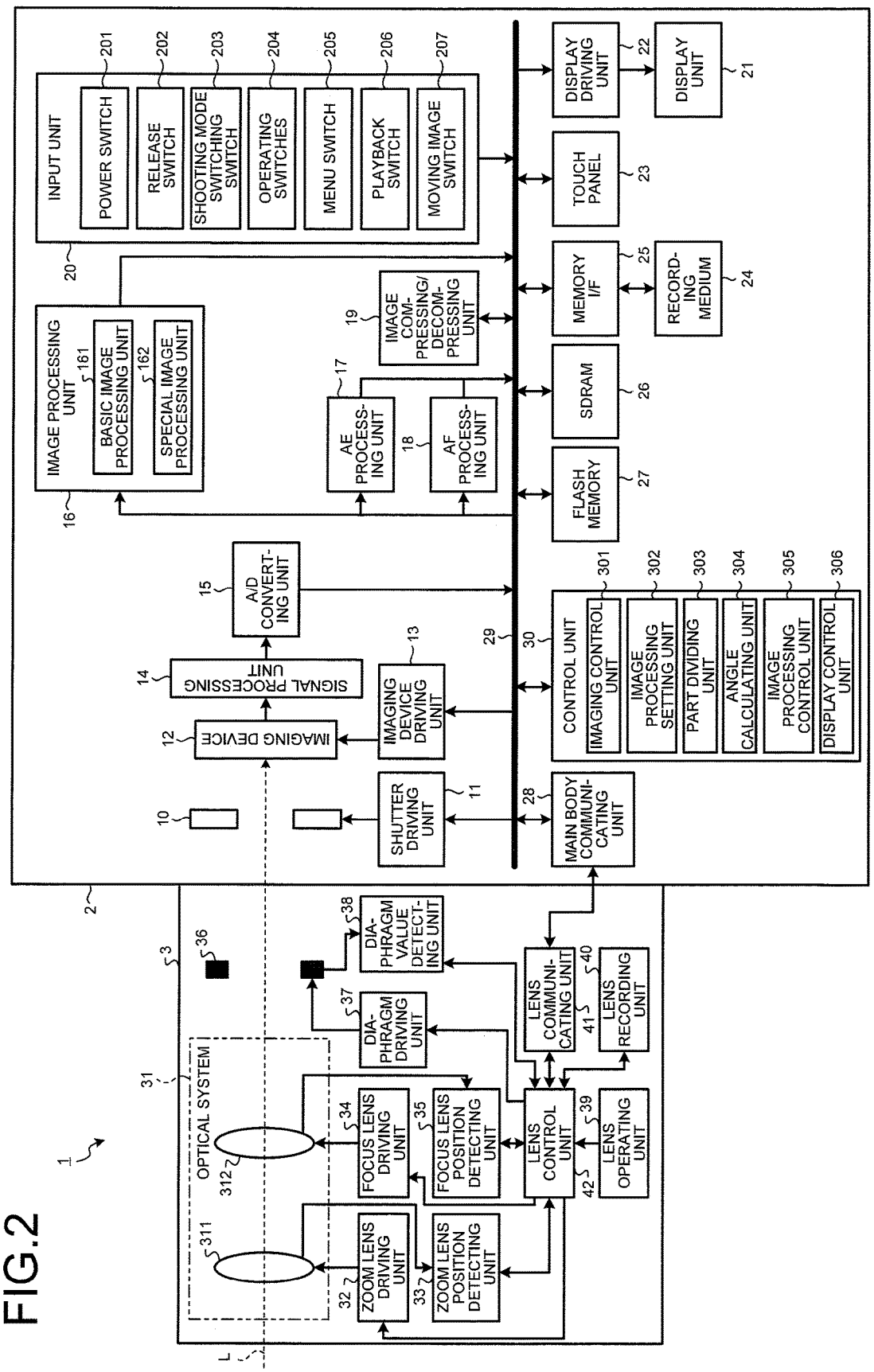
FIG. 2 is a block diagram illustrating a configuration of the imaging apparatus illustrated in FIG. 1.

FIG. 1 is a perspective view illustrating a configuration of a side (front side) of an imaging apparatus 1 facing a user, according to the present first embodiment. FIG. 2 is a block diagram illustrating a configuration of the imaging apparatus 1.

As illustrated in FIG. 1 or 2, the imaging apparatus 1 includes a main body unit 2 and a lens unit 3 which is detachable from the main body unit 2.

Configuration of the Main Body Unit

As illustrated in FIG. 2, the main body unit 2 includes a shutter 10, a shutter driving unit 11, an imaging device 12, an imaging device driving unit 13, a signal processing unit 14, an A/D converting unit 15, an image processing unit 16, an AE processing unit 17, an AF processing unit 18, an image compressing/decompressing unit 19, an input unit 20, a display unit 21, a display driving unit 22, a touch panel 23, a recording medium 24, a memory I/F 25, an SDRAM (Synchronous Dynamic Random Access Memory) 26, a flash memory 27, a main body communicating unit 28, a bus 29, a control unit 30, and the like.

The shutter 10 sets the state of the imaging device 12 to an exposure state or a light-shielding state.

The shutter driving unit 11 is configured using a stepping motor, etc., and drives the shutter 10 according to an instruction signal inputted from the control unit 30.

The imaging device 12 is configured using, for example, a CCD (Charge Coupled Device) or a CMOS (Complementary Metal Oxide Semiconductor) that receives light collected by the lens unit 3 and converts the light into an electrical signal.

The imaging device driving unit 13 allows the imaging device 12 to output image data (analog signal) to the signal processing unit 14 at predetermined timing, according to an instruction signal inputted from the control unit 30.

In this sense, the imaging device driving unit 13 functions as an electronic shutter.

The signal processing unit 14 performs analog processing on the analog signal inputted from the imaging device 12, and outputs the signal to the A/D converting unit 15.

Specifically, the signal processing unit 14 performs a noise reduction process, a gain-up process, and the like, on the analog signal. For example, the signal processing unit 14 reduces the reset noise, etc., of the analog signal and then performs waveform shaping on the analog signal, and further boosts the gain of the analog signal so as to obtain desired brightness.

The A/D converting unit 15 performs A/D conversion on the analog signal inputted from the signal processing unit 14 and thereby generates digital image data, and outputs the digital image data to the SDRAM 26 through the bus 29.

The above-described imaging device 12, signal processing unit 14, and A/D converting unit 15 function as an imaging unit according to the present invention.

The image processing unit 16 obtains image data (RAW data) from the SDRAM 26 through the bus 29 and performs various types of image processing on the obtained image data under the control of the control unit 30. The image data having been subjected to the image processing is outputted to the SDRAM 26 through the bus 29.

As illustrated in FIG. 2, the image processing unit 16 includes a basic image processing unit 161 and a special image processing unit 162.

The basic image processing unit 161 performs basic image processing including, for example, at least an optical black subtraction process, a white balance adjustment process, an image data synchronization process in the case of the imaging device having a Bayer arrangement, a color matrix subtraction process, a γ correction process, a color reproduction process, and an edge enhancement process, on image data. In addition, the basic image processing unit 161 performs a finishing effect process for reproducing a natural image, based on preset parameters for various image processing.

Here, the parameters for various image processing include contrast, sharpness, saturation, white balance, and grayscale values.

For example, the processing items of the finishing effect process include "Natural" which is a processing item for finishing an image to be shot in natural color, "Vivid" which is a processing item for vividly finishing an image to be shot, "Flat" which is a processing item for finishing such that the material of a subject to be shot is emphasized, and "Monotone" which is a processing item for finishing an image to be shot in monochrome.

The special image processing unit 162 performs a special effect process that provides visual effects.

For example, the processing items of the special effect process include "pop art", "fantastic focus", "toy camera photo", "diorama", "rough monochrome", and "joint bend emphasis".

A special effect process corresponding to the processing item "pop art" is the process of colorfully enhancing colors to represent an image with a cheerful and fun atmosphere. The image processing for "pop art" is implemented by a combination of, for example, a saturation adjustment process and a contrast enhancement process.

A special effect process corresponding to the processing item "fantastic focus" is the process of representing an image beautifully and fantastically such that a subject is surrounded by happy light while representing the sense of air in a soft tone and leaving the details of the subject. The image processing for "fantastic focus" is implemented by a combination of, for example, a tone curve process, an airbrushing process, an alpha blending process, and a combining process.

A special effect process corresponding to the processing item "toy camera photo" is the process of representing nostalgia or recollection by providing a shading effect on the periphery of an image. The image processing for "toy camera photo" is implemented by a combination of, for example, a low-pass filter process, a white balance process, a contrast process, a shading process, and a hue/saturation process (see, for example, Japanese Patent Application Laid-open No. 2010-74244 for the detailed description of toy camera photo and shading).

A special effect process corresponding to the processing item "diorama" is the process of representing toyness or artificialness by providing an extreme blur effect on the periphery of an image. The image processing for "diorama" is implemented by a combination of, for example, a hue/saturation process, a contrast process, an airbrushing process, and a combining process.

A special effect process corresponding to the processing item "rough monochrome" is the process of representing roughness by adding extreme contrast and granular film noise. The image processing for "rough monochrome" is implemented by a combination of, for example, an edge enhancement process, a level correction optimization process, a noise pattern superimposition process, a combining process, and a contrast process (see, for example, Japanese Patent Application Laid-open No. 2010-62836 for the detailed description of rough monochrome).

A special effect process corresponding to the processing item "joint bend emphasis" is the process of emphasizing the way a joint of a subject image (person's image) (the angle formed by a pair of adjacent parts included in the person's image) contained in image data is bent. The image processing for "joint bend emphasis" is implemented by a combining process, etc.

The AE processing unit 17 obtains image data stored in the SDRAM 26 through the bus 29 and sets, based on the obtained image data, exposure conditions used when still image shooting or moving image shooting is performed.

Specifically, the AE processing unit 17 calculates luminance from the image data and determines, for example, a diaphragm value, exposure time, and ISO sensitivity based on the calculated luminance, to perform the auto exposure of the imaging apparatus 1.

The AF processing unit 18 obtains image data stored in the SDRAM 26 through the bus 29 and adjusts, based on the obtained image data, the auto focus of the imaging apparatus 1.

For example, the AF processing unit 18 extracts a high frequency component signal from the image data and performs an AF (Auto Focus) computation process on the high frequency component signal and thereby determines the focus evaluation of the imaging apparatus 1, to adjust the auto focus of the imaging apparatus 1.

Note that the method of adjusting the auto focus of the imaging apparatus 1 may be one that obtains a phase-difference signal by the imaging device or a method of a type where a dedicated AF optical system or the like is mounted.

The image compressing/decompressing unit 19 obtains image data from the SDRAM 26 through the bus 29, compresses the obtained image data according to a predetermined format, and outputs the compressed image data to the SDRAM 26.

Here, the compression schemes for still images include a JPEG (Joint Photographic Experts Group) scheme, a TIFF (Tagged Image File Format) scheme, and the like. The compression schemes for moving images include a Motion JPEG scheme, an MP4 (H.264) scheme, and the like.

In addition, the image compressing/decompressing unit 19 obtains image data (compressed image data) recorded in the recording medium 24 through the bus 29 and the memory I/F 25, decompresses (expands) the obtained image data, and outputs the decompressed image data to the SDRAM 26.

The input unit 20 accepts a user operation and outputs an instruction signal according to the user operation to the control unit 30 through the bus 29.

As illustrated in FIG. 1, the input unit 20 includes, for example, a power switch 201 that switches the power state of the imaging apparatus 1 to an on state or an off state; a release switch 202 that accepts a user operation instructing still image shooting; a shooting mode switching switch 203 that switches between various types of shooting modes (a still image shooting mode, a moving image shooting mode, etc.) set on the imaging apparatus 1; operating switches 204 that switch between various types of settings of the imaging apparatus 1; a menu switch 205 that allows the display unit 21 to display various types of settings of the imaging apparatus 1; a playback switch 206 that allows the display unit 21 to display images corresponding to image data recorded in the recording medium 24; and a moving image switch 207 that accepts a user operation instructing moving image shooting.

The release switch 202 can move by an external pressing force. When the release switch 202 is half-pressed, the release switch 202 outputs a first release signal (instruction signal) to the control unit 30 to instruct shooting preparation operation. On the other hand, when the release switch 202 is full-pressed, the release switch 202 outputs a second release signal (instruction signal) to the control unit 30 to instruct still image shooting.

The operating switches 204 include up, down, left, and right direction switches 204a to 204d that perform selection setting on a menu screen, etc.; and an OK switch 204e that confirms operations by the direction switches 204a to 204d on a menu screen, etc. (FIG. 1). Note that the operating switches 204 may be configured using, for example, a dial switch.

The display unit 21 is configured using a display panel composed of, for example, liquid crystal or organic EL (Electro Luminescence).

The display driving unit 22 obtains, through the bus 29, image data stored in the SDRAM 26 or image data recorded in the recording medium 24 and allows the display unit 21 to display an image corresponding to the obtained image data under the control of the control unit 30.

Here, image display includes, for example, rec view display where image data obtained immediately after shooting is displayed for a predetermined period of time, playback display where image data recorded in the recording medium 24 is played back, and live view display where live view images corresponding to image data continuously generated by the imaging device 12 are sequentially displayed chronologically.

In addition, the display unit 21 displays operating information of the imaging apparatus 1 and information about shooting, as appropriate.

As illustrated in FIG. 1, the touch panel 23 is provided on a display screen of the display unit 21, and detects a touch by an external object and outputs a position signal according to the detected touch position.

Here, in general, as the touch panel, for example, resistive, capacitive, and optical touch panels are available. In the first embodiment, any type of touch panel can be applied as the touch panel 23.

The recording medium 24 is configured using, for example, a memory card which is placed from the outside of the imaging apparatus 1. The recording medium 24 is removably placed in the imaging apparatus 1 through the memory I/F 25.

Image data having been subjected to processes by the image processing unit 16 and the image compressing/decompressing unit 19 is written to the recording medium 24 by a read/write apparatus (not illustrated) according to the type of the recording medium 24. Alternatively, image data recorded in the recording medium 24 is read by the read/write apparatus. In addition, the recording medium 24 may output programs and various types of information to the flash memory 27 through the memory I/F 25 and the bus 29 under the control of the control unit 30.

The SDRAM 26 is configured using a volatile memory, and temporarily stores image data inputted from the A/D converting unit 15 through the bus 29, image data inputted from the image processing unit 16 through the bus 29, and information being processed by the imaging apparatus 1.

For example, the SDRAM 26 temporarily stores image data which is sequentially outputted every frame by the imaging device 12 through the signal processing unit 14, the A/D converting unit 15, and the bus 29.

The flash memory 27 is configured using a nonvolatile memory.

The flash memory 27 records, for example, various types of programs (including an imaging program) for allowing the imaging apparatus 1 to operate, various types of data used during the execution of a program, and various types of parameters required for the operation of image processing by the image processing unit 16.

For example, various types of data used during the execution of a program include structure information, association information, and setting information.

The structure information is information about a person's image which is obtained by analyzing multiple image data units, each containing a subject image (person's image).

For example, by analyzing image data, correlation (for example, luminance, color-difference, hue, lightness, and saturation correlation) between a focused pixel and pixels therearound is calculated and feature points that determine the outline of a person's image contained in the image data are extracted from the correlation.

In addition, the above-described analysis is performed on image data having different postures of a subject image (person's image), to extract feature points that determine the above-described outlines in these various postures.

Here, the postures include, for example, a posture where a person's image stands with the body or one side of the body facing the front and a posture where the lower back, knees, elbows, etc., are bent.

The structure information includes information about the outlines of the person's image in the above-described various postures.

Figure 3:
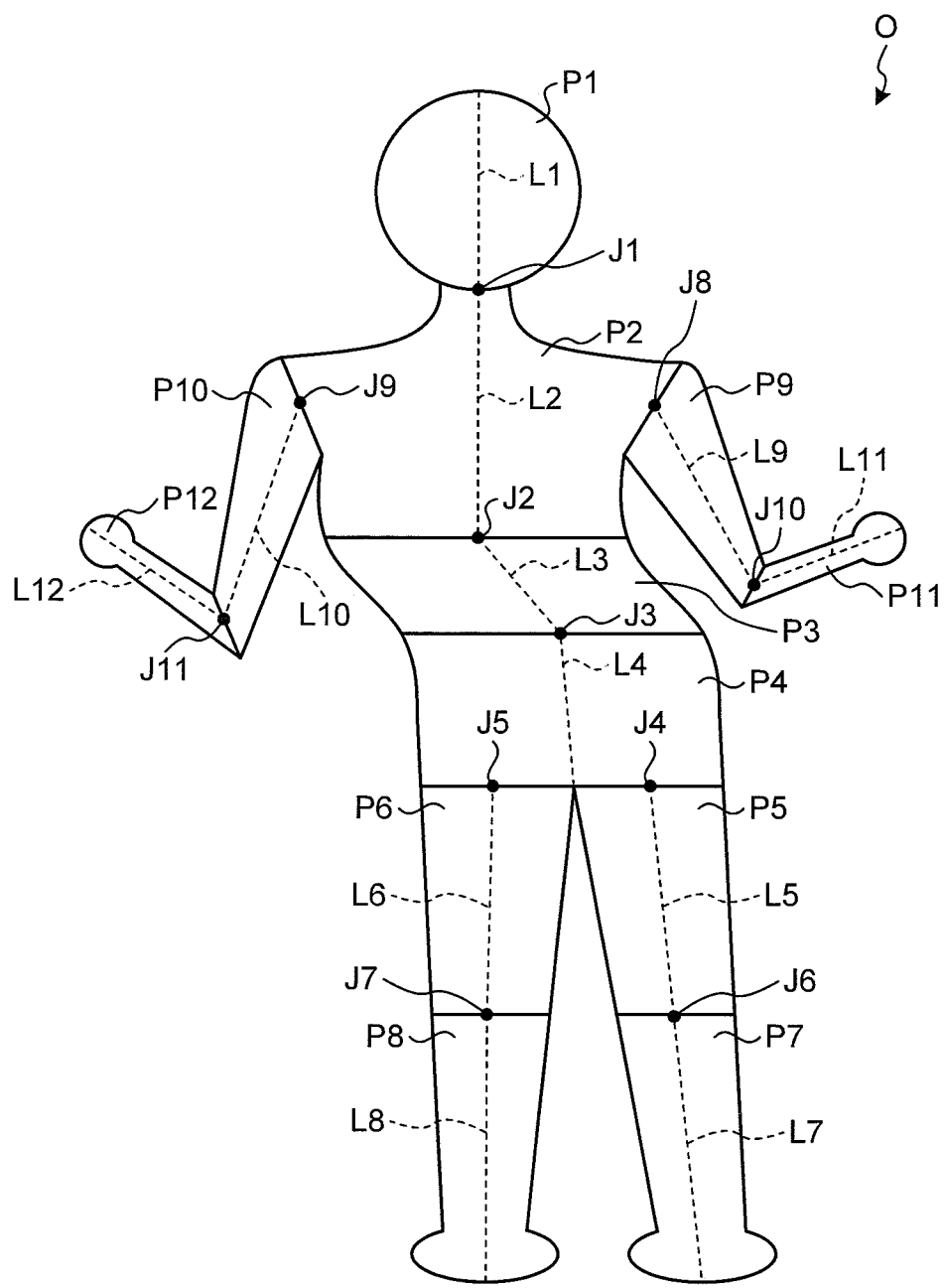
FIG. 3 is a diagram for describing association information and setting information recorded in a flash memory illustrated in FIG. 2.

FIG. 3 is a diagram for describing association information and setting information. Specifically, FIG. 3 is a diagram illustrating that a person's image O contained in image data is divided into a plurality of parts P1 to P12.

Before describing association information and setting information, the plurality of parts P1 to P12 included in the person's image O will be described based on FIG. 3.

For example, as illustrated in FIG. 3, the person's image O is divided into 12 parts: a head part P1, a chest part P2, an upper lower back part P3, a lower lower back part P4, a left upper knee part P5, a right upper knee part P6, a left lower knee part P7, a right lower knee part P8, a left upper elbow part P9, a right upper elbow part P10, a left lower elbow part P11, and a right lower elbow part P12.

11 pairs of the head part P1 and the chest part P2, the chest part P2 and the upper lower back part P3, the upper lower back part P3 and the lower lower back part P4, the lower lower back part P4 and the left upper knee part P5, the lower lower back part P4 and the right upper knee part P6, the left upper knee part P5 and the left lower knee part P7, the right upper knee part P6 and the right lower knee part P8, the chest part P2 and the left upper elbow part P9, the chest part P2 and the right upper elbow part P10, the left upper elbow part P9 and the left lower elbow part P11, and the right upper elbow part P10 and the right lower elbow part P12 (pairs of adjacent parts) are connected by first to eleventh joints J1 to J11, respectively.

The association information is information in which, as an angle formed by a pair of adjacent parts, a first angle obtained before the special image processing unit 162 performs a special effect process (the processing item of "joint bend emphasis") (before the positional relationship between the plurality of parts P1 to P12 is changed) is associated with a second angle obtained after the special effect process is performed (after the positional relationship between the plurality of parts P1 to P12 is changed).

As illustrated in FIG. 3, the angle formed by the head part P1 and the chest part P2 is an angle formed by a straight line L1 connecting the top of the head part P1 to the first joint J1 and a straight line L2 connecting the first and second joints J1 and J2. Note that the straight lines L1 and L2 are straight lines indicating the postures of the head part P1 and the chest part P2, respectively.

In addition, the angle formed by the chest part P2 and the upper lower back part P3 is an angle formed by the straight line L2 and a straight line L3 connecting the second and third joints J2 and J3. Note that the straight line L3 is a straight line indicating the posture of the upper lower back part P3.

In addition, the angle formed by the upper lower back part P3 and the lower lower back part P4 is an angle formed by the straight line L3 and a straight line L4 connecting a midpoint between the fourth and fifth joints J4 and J5 to the third joint J3. Note that the straight line L4 is a straight line indicating the posture of the lower lower back part P4.

In addition, the angle formed by the lower lower back part P4 and the left upper knee part P5 (right upper knee part P6) is an angle formed by the straight line L4 and a straight line L5 connecting the fourth and sixth joints J4 and J6 (a straight line L6 connecting the fifth and seventh joints J5 and J7). Note that the straight lines L5 and L6 are straight lines indicating the postures of the left and right upper knee parts P5 and P6, respectively.

In addition, the angle formed by the left upper knee part P5 (right upper knee part P6) and the left lower knee part P7 (right lower knee part P8) is an angle formed by the straight line L5 (straight line L6) and a straight line L7 connecting the sixth joint J6 to the end of the left lower knee part P7 (a straight line L8 connecting the seventh joint J7 to the end of the right lower knee part P8). Note that the straight lines L7 and L8 are straight lines indicating the postures of the left and right lower knee parts P7 and P8, respectively.

The angle formed by the chest part P2 and the left upper elbow part P9 (right upper elbow part P10) is an angle formed by the straight line L2 and a straight line L9 connecting the eighth and tenth joints J8 and J10 (a straight line L10 connecting the ninth and eleventh joints J9 and J11). Note that the straight lines L9 and L10 are straight lines indicating the postures of the left and right upper elbow parts P9 and P10, respectively.

The angle formed by the left upper elbow part P9 (right upper elbow part P10) and the left lower elbow part P11 (right lower elbow part P12) is an angle formed by the straight line L9 (straight line L10) and a straight line L11 connecting the tenth joint J10 to the end of the left lower elbow part P11 (a straight line L12 connecting the eleventh joint J11 to the end of the right lower elbow part P12). Note that the straight lines L11 and L12 are straight lines indicating the postures of the left and right lower elbow parts P11 and P12, respectively.

Namely, the angle formed by a pair of adjacent parts is substantially 0° when the person's image O is in an upright posture. In addition, the angle formed by a pair of adjacent parts is small when the way the joint is bent is small, and is large when the way the joint is bent is large.

The posture of the person's image O illustrated in FIG. 3 is a posture where the person's image stands with the body facing the front, and while the upper body (upper than the third joint J3) leans rightward, the chest part P2 leans leftward such that both shoulders (the eighth and ninth joints J8 and J9) are substantially horizontal, and furthermore, both arms are detached from the body and both elbows are bent.

Hence, the angle formed by the chest part P2 and the upper lower back part P3, the angle formed by the upper lower back part P3 and the lower lower back part P4, the angle formed by the chest part P2 and the left upper elbow part P9 (right upper elbow part P10), and the angle formed by the left upper elbow part P9 (right upper elbow part P10) and the left lower elbow part P11 (right lower elbow part P12) are angles larger than 0°. Other angles are substantially 0°.

Association information is such that a first angle is set to an angle larger than 0° and a second angle associated with the first angle is set to an angle larger than the first angle.

Namely, a special effect process (the processing item of "joint bend emphasis") performed by the special image processing unit 162 is the process of bending a joint that is bent to a certain extent (first angle) (in the example of FIG. 3, the second, third, and eighth to eleventh joints J2, J3, and J8 to J11) at a larger angle (second angle).

FIG. 4 is a diagram illustrating an example of setting information recorded in the flash memory 27.

The setting information is information in which, of a pair of adjacent parts, a fixed part whose position is fixed and a position change part whose position is to be changed when the special image processing unit 162 performs a special effect process (the processing item of "joint bend emphasis") are set.

In the example illustrated in FIG. 4, of a pair of adjacent parts, a part whose length from the lower lower back part P4 through a joint(s) is shorter is set as a fixed part, and a part whose length is longer is set as a position change part.

For example, in the case of the head part P1 and the chest part P2, since the length from the lower lower back part P4 to the head part P1 through joints is longer than the length to the chest part P2, the head part P1 is set as a position change part and the chest part P2 is set as a fixed part.

The flash memory 27 described above functions as an association information recording unit and a setting information recording unit according to the present invention.

The main body communicating unit 28 is a communication interface for performing communication with the lens unit 3 attached to the main body unit 2.

The bus 29 is configured using, for example, a transmission path that connects the components of the imaging apparatus 1, and transfers various types of data generated within the imaging apparatus 1 to the components of the imaging apparatus 1.

The control unit 30 is configured using, for example, a CPU (Central Processing Unit), and performs overall control of the operation of the imaging apparatus 1 by, for example, transferring, through the bus 29, relevant instructions or data to the units composing the imaging apparatus 1, according to an instruction signal from the input unit 20 or a position signal from the touch panel 23.

For example, when a second release signal is inputted or when a subject strikes a specified pose with the imaging apparatus 1 set to a pose shooting mode, the control unit 30 performs control to start shooting operation in the imaging apparatus 1.

Here, the shooting operation in the imaging apparatus 1 refers to operation where the signal processing unit 14, the A/D converting unit 15, and the image processing unit 16 perform predetermined processes on image data that is outputted from the imaging device 12 by the drive of the shutter driving unit 11 and the imaging device driving unit 13. The image data having been subjected to the processes in the above-described manner is compressed by the image compressing/decompressing unit 19 and recorded in the recording medium 24 through the bus 29 and the memory I/F 25 under the control of the control unit 30.

As illustrated in FIG. 2, the control unit 30 includes, for example, an imaging control unit 301, an image processing setting unit 302, a part dividing unit 303, an angle calculating unit 304, an image processing control unit 305, and a display control unit 306.

The imaging control unit 301 outputs an instruction signal to the shutter driving unit 11 and the imaging device driving unit 13, according to, for example, an instruction signal from the input unit 20 or a position signal from the touch panel 23 which is inputted through the bus 29, to start shooting operation.

The image processing setting unit 302 sets the details of image processing (a finishing effect process and a special effect process) to be performed by the image processing unit 16, according to an instruction signal from the input unit 20 or a position signal from the touch panel 23 which is inputted through the bus 29.

The part dividing unit 303 analyzes image data stored in the SDRAM 26 and divides a person's image O contained in the image data into a plurality of parts P1 to P12, using joint position information about joints (corresponding to position information according to the present invention) which are estimated from, for example, a database obtained from the features of skeletal positions, movements, and sizes specific to the human body (application to animals is also possible).

Note that, when there is a part that bends at a junction between bones besides joints, the person's image O contained in the image data may be divided into a plurality of parts P1 to P12, using junction position information about the junctions between bones (corresponding to position information according to the present invention) which are estimated from, for example, a database such as that described above.

The angle calculating unit 304 calculates an angle formed by a pair of adjacent parts among a plurality of parts divided by the part dividing unit 303.

The image processing control unit 305 functions as a changed-image data generating unit according to the present invention, and allows the image processing unit 16 to perform image processing, according to the details of image processing set by the image processing setting unit 302.

The display control unit 306 controls the display mode of the display unit 21.

The main body unit 2 having the above-described configurations may be provided with, for example, an audio input/output function, a flash function, a detachable electronic viewfinder (EVF), and a communicating unit that can perform interactive communication with an external processing apparatus such as a personal computer through the Internet.

Configuration of the Lens Unit

As illustrated in FIG. 2, the lens unit 3 includes an optical system 31, a zoom lens driving unit 32, a zoom lens position detecting unit 33, a focus lens driving unit 34, a focus lens position detecting unit 35, a diaphragm 36, a diaphragm driving unit 37, a diaphragm value detecting unit 38, a lens operating unit 39, a lens recording unit 40, a lens communicating unit 41, and a lens control unit 42.

The optical system 31 collects light from a predetermined field of view area, and forms the collected light on an imaging plane of the imaging device 12. As illustrated in FIG. 2, the optical system 31 includes a zoom lens 311 and a focus lens 312.

The zoom lens 311 is configured using a single or a plurality of lenses, and changes the zoom magnification of the optical system 31 by moving along an optical axis L (FIG. 2).

The focus lens 312 is configured using a single or a plurality of lenses, and changes the focus position and focal length of the optical system 31 by moving along the optical axis L.

The zoom lens driving unit 32 is configured using, for example, a stepping motor or a DC motor, and allows the zoom lens 311 to move along the optical axis L under the control of the lens control unit 42.

The zoom lens position detecting unit 33 is configured using, for example, a photointerrupter, and detects the position of the zoom lens 311 driven by the zoom lens driving unit 32.

Specifically, the zoom lens position detecting unit 33 converts the amount of rotation of a driving motor included in the zoom lens driving unit 32 into the number of pulses and detects, based on the converted number of pulses, the position on the optical axis L of the zoom lens 311 from a reference position based on infinity.

The focus lens driving unit 34 is configured using, for example, a stepping motor or a DC motor, and allows the focus lens 312 to move along the optical axis L under the control of the lens control unit 42.

The focus lens position detecting unit 35 is configured using, for example, a photointerrupter, and detects the position on the optical axis L of the focus lens 312 driven by the focus lens driving unit 34, by the same method as that for the zoom lens position detecting unit 33.

The diaphragm 36 adjusts exposure by limiting the amount of incident light collected by the optical system 31.

The diaphragm driving unit 37 is configured using, for example, a stepping motor, and adjusts the amount of light entering the imaging device 12 by driving the diaphragm 36 under the control of the lens control unit 42.

The diaphragm value detecting unit 38 detects the diaphragm value of the diaphragm 36 by detecting the state of the diaphragm 36 driven by the diaphragm driving unit 37. The diaphragm value detecting unit 38 is configured using, for example, a potentiometer such as a linear encoder or a variable resistive element and an A/D converter circuit.

As illustrated in FIG. 1, the lens operating unit 39 is, for example, an operating ring provided around a lens barrel of the lens unit 3, and accepts a user operation instructing the operation of the zoom lens 311 or the focus lens 312 in the optical system 31 or the operation of the imaging apparatus 1. Note that the lens operating unit 39 may be, for example, a push type switch.

The lens recording unit 40 records, for example, a control program for determining the positions and movements of the optical system 31 and the diaphragm 36, and the magnification, focal length, angle of view, aberration, and F value (brightness) of the optical system 31.

The lens communicating unit 41 is a communication interface for performing communication with the main body communicating unit 28 of the main body unit 2 when the lens unit 3 is attached to the main body unit 2.

The lens control unit 42 is configured using, for example, a CPU and controls the operation of the lens unit 3 according to an instruction signal or a drive signal from the control unit 30 which is inputted through the main body communicating unit 28 and the lens communicating unit 41.

In addition, the lens control unit 42 outputs the position of the zoom lens 311 detected by the zoom lens position detecting unit 33, the position of the focus lens 312 detected by the focus lens position detecting unit 35, and the diaphragm value of the diaphragm 36 detected by the diaphragm value detecting unit 38, to the control unit 30 through the main body communicating unit 28 and the lens communicating unit 41.

Operation of the Imaging Apparatus

Figure 5:
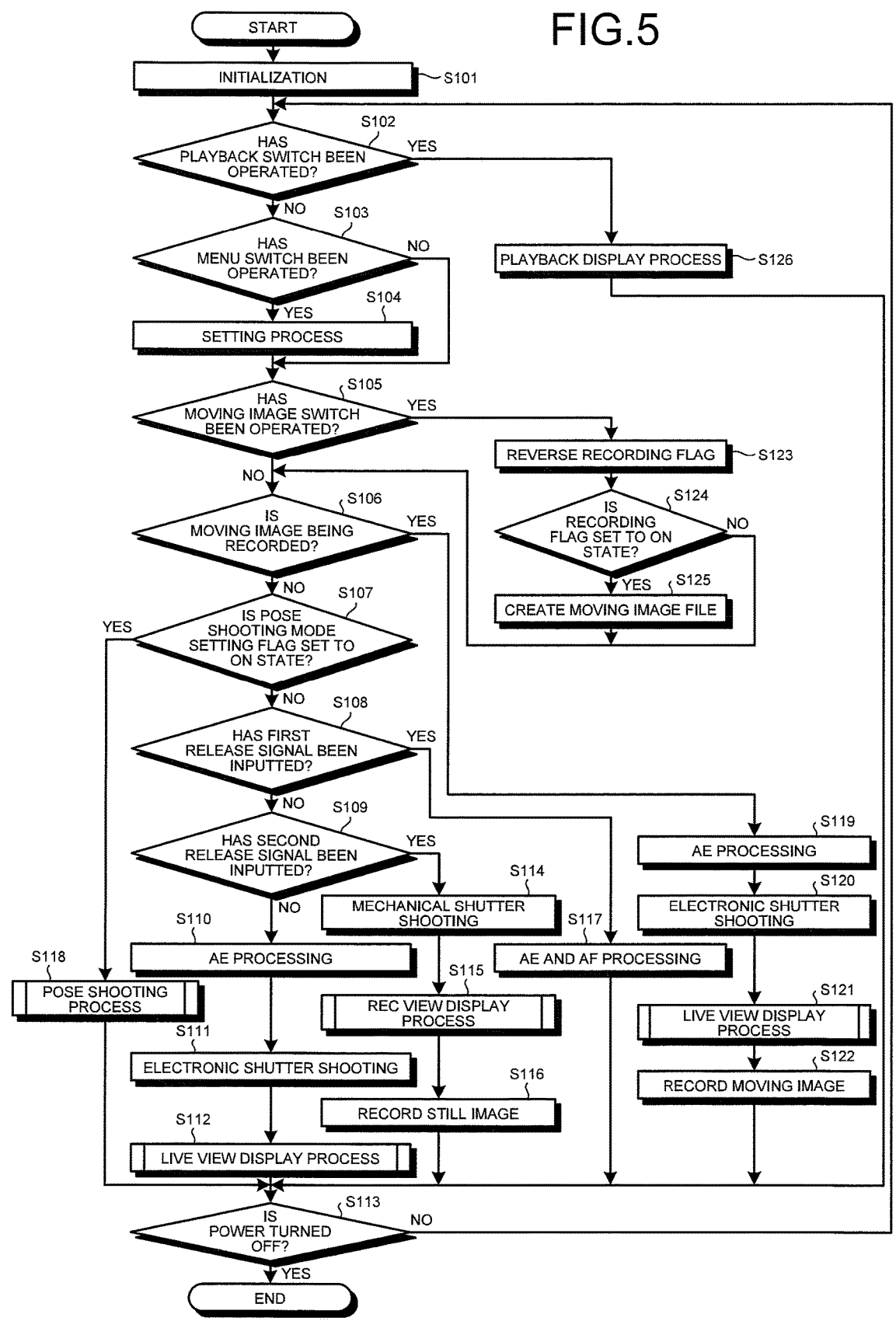
FIG. 5 is a flowchart illustrating the operation of the imaging apparatus according to the first embodiment of the present invention.

FIG. 5 is a flowchart illustrating the operation of the imaging apparatus 1.

When the power to the imaging apparatus 1 is turned on by a user operating the power switch 201, the control unit 30 performs initialization of the imaging apparatus 1 (step S101).

Specifically, the control unit 30 performs initialization where a recording flag indicating that a moving image is being recorded is set to the off state. The recording flag is a flag that is set to the on state during shooting of a moving image, and is set to the off state when a moving image is not being shot. The recording flag is stored in the SDRAM 26.

Subsequently, when the menu switch 205 is operated (step S103: Yes) without operating the playback switch 206 (step S102: No), the imaging apparatus 1 displays a menu screen and performs a setting process for setting various types of conditions of the imaging apparatus 1 according to a user's selection operation (step S104) and transitions to step S105. Note that the details of the setting process for various types of conditions (step S104) will be described later.

On the other hand, when the menu switch 205 is not operated (step S103: No) without operating the playback switch 206 (step S102: No), the imaging apparatus 1 transitions to step S105:

At step S105, the control unit 30 determines whether the moving image switch 207 has been operated.

If it is determined that the moving image switch 207 has been operated (step S105: Yes), the imaging apparatus 1 transitions to step S123.

On the other hand, if it is determined that the moving image switch 207 has not been operated (step S105: No), the imaging apparatus 1 transitions to step S106.

At step S106, the control unit 30 determines whether the imaging apparatus 1 is in the process of recording a moving image.

If it is determined that the imaging apparatus 1 is not in the process of recording a moving image (step S106: No), the control unit 30 determines whether a pose shooting mode has been set in the setting process at step S104 (whether a pose shooting mode setting flag stored in the SDRAM 26 is set to the on state) (step S107).

If it is determined that the pose shooting mode setting flag is set to the off state (step S107: No) and a first release signal has been inputted from the release switch 202 (step S108: Yes), the imaging apparatus 1 transitions to step S117.

On the other hand, if a first release signal has not been inputted through the release switch 202 (step S108: No), the imaging apparatus 1 transitions to step S109.

The case will be described in which at step S109 a second release signal has not been inputted through the release switch 202 (step S109: No).

In this case, the imaging control unit 301 allows the AE processing unit 17 to perform AE processing for adjusting exposure (step S110).

Subsequently, the imaging control unit 301 performs electronic shutter shooting by driving the imaging device driving unit 13 (step S111). Image data that is generated by the imaging device 12 by the electronic shutter shooting is outputted to the signal processing unit 14, the A/D converting unit 15, and the SDRAM 26 through the bus 29.

Subsequently, the control unit 30 performs a live view display process for allowing the display unit 21 to display live view images corresponding to the image data that is generated by the imaging device 12 by the electronic shutter shooting (step S112).

Note that the details of the live view display process (step S112) will be described later.

Subsequently, the control unit 30 determines whether the power to the imaging apparatus 1 has been turned off by operating the power switch 201 (step S113).

If it is determined that the power to the imaging apparatus 1 has been turned off (step S113: Yes), the imaging apparatus 1 ends the process.

On the other hand, if it is determined that the power to the imaging apparatus 1 has not been turned off (step S113: No), the imaging apparatus 1 returns to step S102.

Referring back to step S109, the case will be described in which a second release signal has been inputted from the release switch 202 (step S109: Yes).

In this case, the imaging control unit 301 performs mechanical shutter shooting by driving the shutter driving unit 11 and the imaging device driving unit 13 (step S114). Image data that is generated by the imaging device 12 by the mechanical shutter shooting is outputted to the signal processing unit 14, the A/D converting unit 15, and the SDRAM 26 through the bus 29.

Subsequently, the control unit 30 performs a rec view display process for allowing the display unit 21 to display a rec view image corresponding to the image data that is generated by the imaging device 12 by the mechanical shutter shooting (step S115).

Note that the details of the rec view display process (step S115) will be described later.

Thereafter, the imaging control unit 301 allows the image compressing/decompressing unit 19 to compress the image data in a recording format set in the setting process at step S104, and records the compressed image data in the recording medium 24 (step S116). Then, the imaging apparatus 1 transitions to step S113.

Note that the imaging control unit 301 may allow the recording medium 24 to record the image data compressed in the above-described recording format by the image compressing/decompressing unit 19, such that the image data is associated with RAW data that has not been subjected to image processing by the image processing unit 16.

Referring back to step S108, the case will be described in which a first release signal has been inputted from the release switch 202 (step S108: Yes).

In this case, the imaging control unit 301 allows the AE processing unit 17 to perform AE processing for adjusting exposure and allows the AF processing unit 18 to perform AF processing for adjusting the focus (step S117). Thereafter, the imaging apparatus 1 transitions to step S113.

Referring back to step S107, if it is determined that the pose shooting mode setting flag is set to the on state (step S107: Yes), the control unit 30 performs a pose shooting process (step S118).

Note that the details of the pose shooting process (step S118) will be described later.

Referring back to step S106, the case will be described in which it is determined that the imaging apparatus 1 is in the process of recording a moving image (step S106: Yes).

In this case, the imaging control unit 301 allows the AE processing unit 17 to perform AE processing for adjusting exposure (step S119).

Subsequently, the imaging control unit 301 performs electronic shutter shooting by driving the imaging device driving unit 13 (step S120). Image data that is generated by the imaging device 12 by the electronic shutter shooting is outputted to the signal processing unit 14, the A/D converting unit 15, and the SDRAM 26 through the bus 29.

Subsequently, the control unit 30 performs a live view display process for allowing the display unit 21 to display live view images corresponding to the image data that is generated by the imaging device 12 by the electronic shutter shooting (step S121).

Note that the details of the live view display process (step S121) will be described later.

Thereafter, at step S122, the imaging control unit 301 allows the image compressing/decompressing unit 19 to compress the image data in a recording format set in the setting process at step S104, and records the compressed image data as a moving image in a moving image file created in the recording medium 24. Then, the imaging apparatus 1 transitions to step S113.

Referring back to step S105, the case will be described in which the moving image switch 207 has been operated (step S105: Yes).

In this case, the control unit 30 reverses a recording flag indicating that a moving image is being recorded when the flag is set to the on state (step S123).

Subsequently, the control unit 30 determines whether the recording flag stored in the SDRAM 26 is set to the on state (step S124).

If it is determined that the recording flag is set to the on state (step S124: Yes), the control unit 30 creates in the recording medium 24 a moving image file for chronologically recording image data in the recording medium 24 (step S125), and the imaging apparatus 1 transitions to step S106.

On the other hand, if it is determined that the recording flag is not set to the on state (step S124: No), the imaging apparatus 1 transitions to step S106.

Referring back to step S102, the case will be described in which the playback switch 206 has been operated (step S102: Yes).

In this case, the display control unit 306 performs a playback display process for obtaining image data from the recording medium 24 through the bus 29 and the memory I/F 25, decompressing the obtained image data in the image compressing/decompressing unit 19, and allowing the display unit 21 to display the image data (step S126). Thereafter, the imaging apparatus 1 transitions to step S113.

Figure 6:
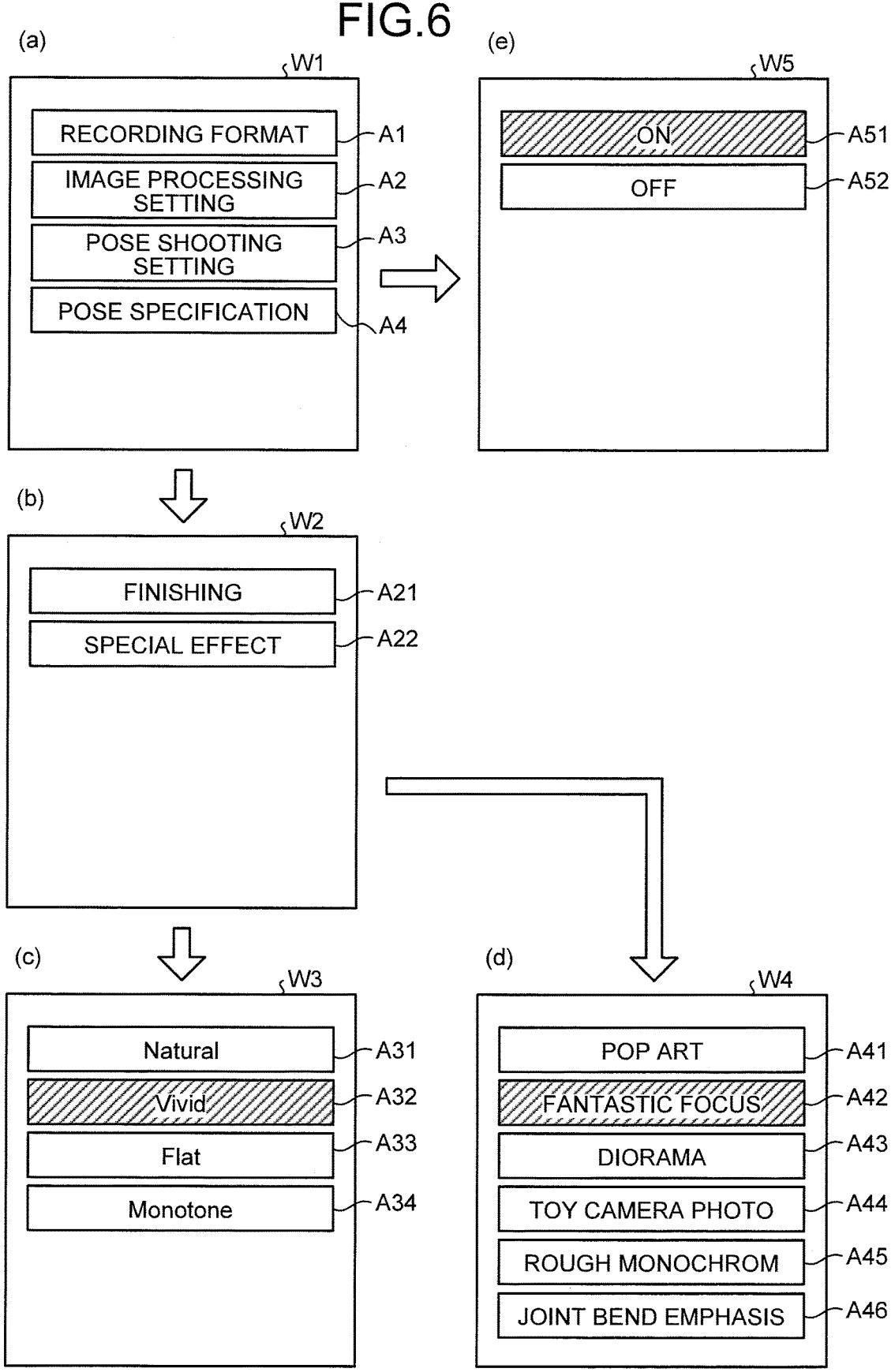
FIG. 6 is a diagram illustrating the screen transition of a menu screen displayed by a display unit when a menu switch illustrated in FIG. 2 is operated.

Setting process for various types of conditions FIG. 6 and FIG. 7 are diagrams illustrating the screen transitions of a menu screen displayed by the display unit 21 when the menu switch 205 is operated.

Next, the setting process for various types of conditions (step S104) illustrated in FIG. 5 will be described based on (a) to (e) of FIG. 6 and (a) and (b) of FIG. 7.

When the menu switch 205 is operated, the display control unit 306 allows the display unit 21 to display, as illustrated in (a) of FIG. 6, a menu screen W1 showing the details of the settings of the imaging apparatus 1.

On the menu screen W1 are displayed, for example, a recording format icon A1, an image processing setting icon A2, a pose shooting setting icon A3, and a pose specification icon A4.

The recording format icon A1 is an icon that accepts a user operation instructing to display on the display unit 21 a recording format menu screen (not illustrated) for setting the recording format of each of a still image and a moving image.

The image processing setting icon A2 is an icon that accepts a user operation instructing to display an image processing selection screen W2 ((b) of FIG. 6) on the display unit 21.

The pose shooting setting icon A3 is an icon that accepts a user operation instructing to display a pose shooting setting screen W5 ((e) of FIG. 6) on the display unit 21.

The pose specification icon A4 is an icon that accepts a user operation instructing to display a pose specification screen W6 ((a) and (b) of FIG. 7) on the display unit 21.

When the user touches (hereinafter, described as a user's touch operation) the display position of the image processing setting icon A2 on the display screen (touch panel 23) with the menu screen W1 displayed on the display unit 21, the image processing setting icon A2 is selected.

Then, as illustrated in (b) of FIG. 6, the display control unit 306 allows the display unit 21 to display an image processing selection screen W2.

On the image processing selection screen W2 are displayed a finishing icon A21 and a special effect icon A22.

The finishing icon A21 is an icon that accepts a user operation instructing to display on the display unit 21 a finishing effect process selection screen W3 ((c) of FIG. 6) that urges to select a finishing effect process to be performed by the basic image processing unit 161.

The special effect icon A22 is an icon that accepts a user operation instructing to display on the display unit 21 a special effect process selection screen W4 ((d) of FIG. 6) that urges to select a special effect process to be performed by the special image processing unit 162.

When the finishing icon A21 is selected by a user's touch operation with the image processing selection screen W2 displayed on the display unit 21, the display control unit 306 allows the display unit 21 to display, as illustrated in (c) of FIG. 6, a finishing effect process selection screen W3.

On the finishing effect process selection screen W3 are displayed a Natural icon A31, a Vivid icon A32, a Flat icon A33, and a Monotone icon A34 as icons corresponding to the processing items of a finishing effect process. Each of the icons A31 to A34 is an icon that accepts a user operation instructing to set a process corresponding to a finishing effect process to be performed by the basic image processing unit 161.

When any of the icons A31 to A34 is selected by a user's touch operation with the finishing effect process selection screen W3 displayed on the display unit 21, the display control unit 306 highlights the selected icon (represented by hatching in (a) to (e) of FIG. 6). Note that (c) of FIG. 6 illustrates a state in which the Vivid icon A32 is selected.

In addition, the image processing setting unit 302 sets a finishing effect process corresponding to the selected icon, as a process to be performed by the basic image processing unit 161.

Then, information about the finishing effect process set by the image processing setting unit 302 is outputted to the SDRAM 26 through the bus 29.

In addition, when the special effect icon A22 is selected by a user's touch operation with the image processing selection screen W2 displayed on the display unit 21, the display control unit 306 allows the display unit 21 to display, as illustrated in (d) of FIG. 6, a special effect process selection screen W4.

On the special effect process selection screen W4 are displayed a pop art icon A41, a fantastic focus icon A42, a diorama icon A43, a toy camera photo icon A44, a rough monochrome icon A45, and a joint bend emphasis icon A46 as icons corresponding to the processing items of a special effect process. Each of the icons A41 to A46 is an icon that accepts a user operation instructing to set a special effect process to be performed by the special image processing unit 162.

When any of the icons A41 to A46 is selected by a user's touch operation with the special effect process selection screen W4 displayed on the display unit 21, the display control unit 306 highlights the selected icon. Note that (d) of FIG. 6 illustrates a state in which the fantastic focus icon A42 is selected.

In addition, the image processing setting unit 302 sets a special effect process corresponding to the selected icon, as a process to be performed by the special image processing unit 162.

Then, information about the special effect process set by the image processing setting unit 302 is outputted to the SDRAM 26 through the bus 29.

Furthermore, when the pose shooting setting icon A3 is selected by a user's touch operation with the menu screen W1 displayed on the display unit 21, the display control unit 306 allows the display unit 21 to display, as illustrated in (e) of FIG. 6, a pose shooting setting screen W5.

The pose shooting setting screen W5 is a screen that allows the user to set a pose shooting mode where shooting operation is performed when a subject strikes a specified pose. An ON icon A51 and an OFF icon A52 are displayed on the pose shooting setting screen W5.

The ON icon A51 is an icon that accepts a user operation instructing to set the pose shooting mode.

The OFF icon A52 is an icon that accepts a user operation instructing not to set the pose shooting mode.

When either one of the icons A51 and A52 is selected by a user's touch operation with the pose shooting setting screen W5 displayed on the display unit 21, the display control unit 306 highlights the selected icon. Note that (e) of FIG. 6 illustrates a state in which the ON icon A51 is selected.

In addition, when the ON icon A51 is selected, the control unit 30 sets the pose shooting mode setting flag stored in the SDRAM 26 to the on state. When the OFF icon A52 is selected, the control unit 30 sets the pose shooting mode setting flag to the off state.

In addition, when the pose specification icon A4 is selected by a user's touch operation with the menu screen W1 displayed on the display unit 21, the display control unit 306 allows the display unit 21 to display, as illustrated in (a) of FIG. 7, a pose specification screen W6.

The pose specification screen W6 is a screen that allows the user to set, by a touch operation, a specified pose used in the pose shooting mode. On the pose specification screen W6 is displayed the text "pose specification by touch operation", in addition to an avatar image A61 and an OK icon A62.

The avatar image A61 is an image of the self-representation of a person which is a subject, and is divided into a plurality of parts (resions) P1 to P12 connected by first to eleventh joints J1 to J11, as with the person's image O illustrated in FIG. 3.

The OK icon A62 is an icon that accepts a user operation instructing to confirm the specified pose.

When, with the pose specification screen W6 displayed on the display unit 21, the display position of the avatar image A61 is touched on the touch panel 23 by a user's touch operation and then slid, the display control unit 306 changes the display state of the avatar image A61.

Specifically, the display control unit 306 allows the display position of the touched part to move in the slide direction with a joint bent.

For example, when the head part P1 is touched by a user's touch operation and then slid in a direction D1 indicated by an arrow illustrated in (a) of FIG. 7, the display control unit 306 rotates the display position of the head part P1 of the avatar image A61 about the first joint J1 in the direction D1 by an angle according to the amount of the slide ((b) of FIG. 7).

Then, when the OK icon A62 is selected by a user's touch operation, the angle calculating unit 304 calculates straight lines L1 to L12 (see FIG. 3), based on the display positions of the parts P1 to P12 (the display positions of the first to eleventh joints J1 to J11) of the avatar image A61 obtained when the OK icon A62 is selected. The angle calculating unit 304 further calculates angles formed by each pair of adjacent parts in the avatar image A61, based on the calculated straight lines L1 to L12. Then, the angle calculating unit 304 outputs information about the angles formed by each pair of adjacent parts in the avatar image A61 (corresponding to positional relationship information according to the present invention) to the SDRAM 26 through the bus 29. Note that, when information about the angles formed by each pair of adjacent parts in the avatar image A61 is already stored in the SDRAM 26, the information is updated with the latest information about the specified pose.

In the following, information about the angles formed by each pair of adjacent parts in the avatar image A61 is described as information about the specified pose.

The above-described SDRAM 26 functions as a positional relationship storage unit according to the present invention.

As described above, step S104 includes an avatar image displaying step and a positional relationship storing step according to the present invention.

Pose Shooting Process

Figure 8:
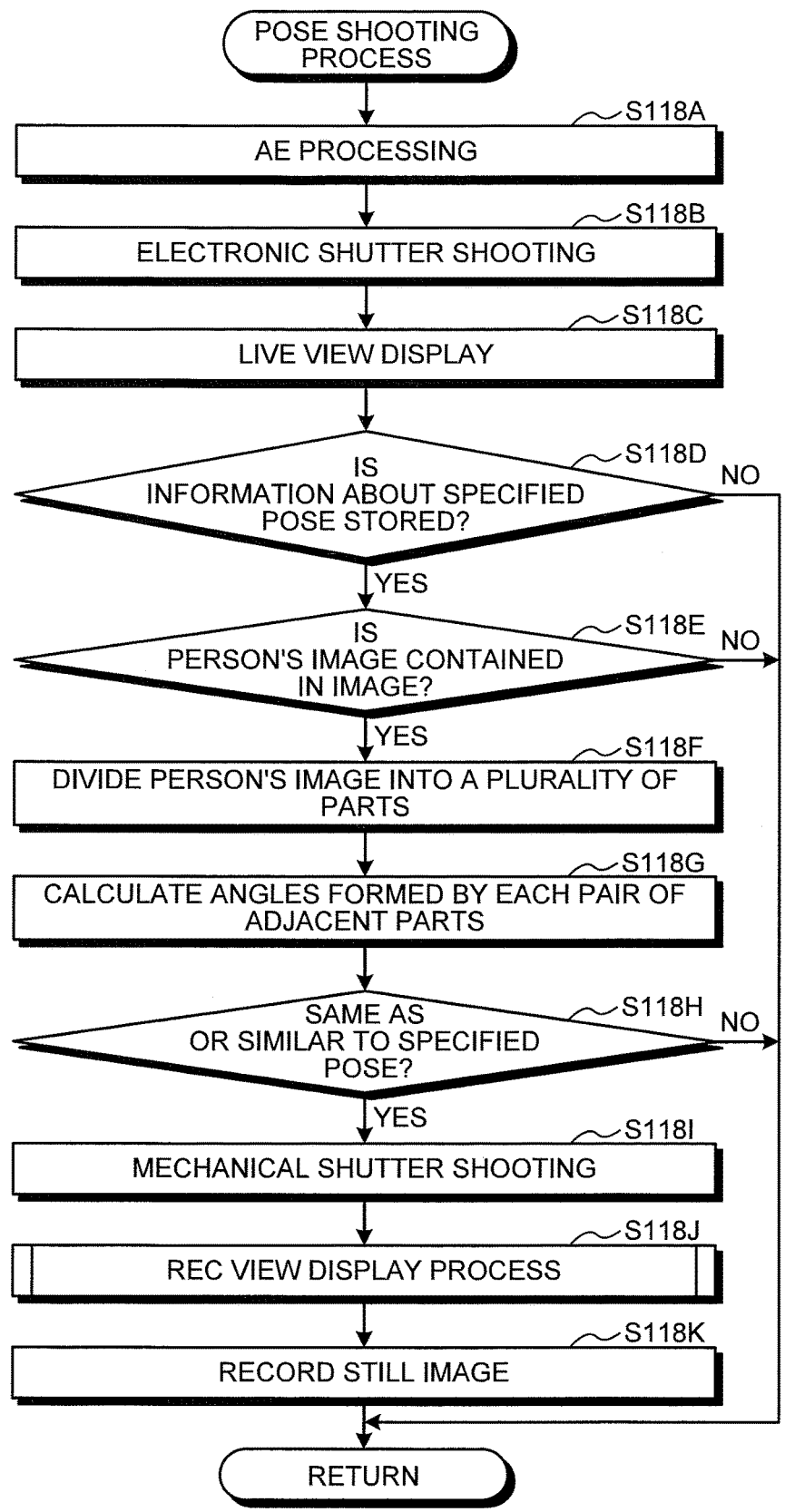
FIG. 8 is a flowchart illustrating a summary of a pose shooting process (step S118) illustrated in FIG. 5.

FIG. 8 is a flowchart illustrating a summary of a pose shooting process.

Next, the pose shooting process (step S118) illustrated in FIG. 5 will be described based on FIG. 8.

The imaging control unit 301 allows the AE processing unit 17 to perform AE processing for adjusting exposure (step S118A).

Subsequently, the imaging control unit 301 performs electronic shutter shooting by driving the imaging device driving unit 13 (step S118B: imaging step). Image data that is generated by the imaging device 12 by the electronic shutter shooting is outputted to the signal processing unit 14, the A/D converting unit 15, and the SDRAM 26 through the bus 29.

Subsequently, the display control unit 306 allows the display unit 21 to display live view images corresponding to the image data that is generated by the electronic shutter shooting (step S118B) (step S118C).

Subsequently, the control unit 30 determines whether information about a specified pose is stored in the SDRAM 26 in the setting process at step S104 (step S118D).

If it is determined that information about a specified pose is not stored in the SDRAM 26 (step S118D: No), the control unit 30 ends the pose shooting process. Thereafter, the imaging apparatus 1 returns to the main routine illustrated in FIG. 5.

On the other hand, if it is determined that information about a specified pose is stored in the SDRAM 26 (step S118D: Yes), the part dividing unit 303 reads the image data stored in the SDRAM 26 (step S118B) and determines whether a person's image O is contained in the image data (step S118E).

Specifically, the part dividing unit 303 calculates correlation (for example, luminance, color-difference, hue, lightness, and saturation correlation) between a focused pixel and pixels therearound by analyzing the image data, and extracts feature points that determine the outlines of structures contained in the image data from the correlation.

Then, the part dividing unit 303 compares the extracted feature points of the structures with information about the outline of the person's image O included in structure information recorded in the flash memory 27, to determine whether the person's image O is contained in the image data.

If it is determined that the person's image O is not contained in the image data (step S118E: No), the control unit 30 ends the pose shooting process. Thereafter, the imaging apparatus 1 returns to the main routine illustrated in FIG. 5.

On the other hand, if it is determined that the person's image O is contained in the image data (step S118E: Yes), the part dividing unit 303 divides the person's image O into a plurality of parts P1 to P12, based on the extracted feature points that determine the outline of the person's image O (step S118F: part dividing step).

Figure 9:
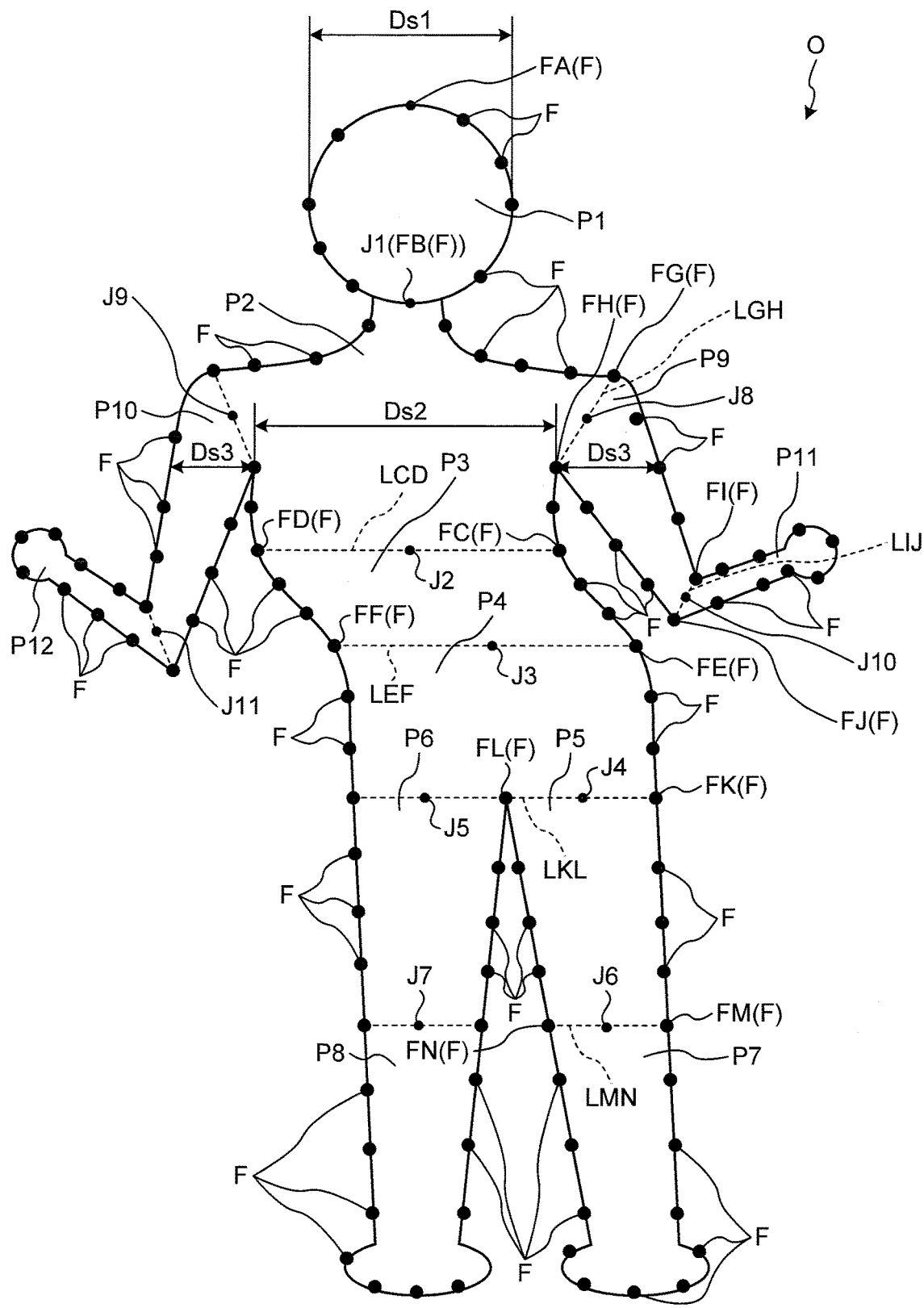
FIG. 9 is a diagram for describing step S118F illustrated in FIG. 8.

FIG. 9 is a diagram for describing step S118F.

Specifically, as illustrated in FIG. 9, the part dividing unit 303 sets, as a head part P1, a resion having a substantially circular outline including the top FA (a point located on the uppermost side) among the feature points F that determine the outline of the person's image O. Note that the head part P1 can also be determined using a face detection technique that determines a face image portion from shadow information based on a face part.

Subsequently, the part dividing unit 303 sets, as a first joint J1, a point FB located on the lowermost side of the head part P1.

Subsequently, the part dividing unit 303 determines one of three branched resions located directly below the head part P1 that has a larger width size Ds2 than a width size Ds1 of the head part P1 and that is branched into two parts at its lower side, to be a trunk part.

Here, the part dividing unit 303 searches for four (two on each of the left and right sides) bent bending points FC to FF, based on the outline (feature points F) forming the trunk part. Then, the part dividing unit 303 sets, as a candidate for a chest part, a resion of the trunk part that is on the upper side than a straight line LCD connecting the bending points FC and FD located on the upper side. In addition, the part dividing unit 303 sets, as an upper lower back part P3, a resion that is located directly below the candidate for the chest part and that is on the upper side than a straight line LEF connecting the bending points FE and FF located on the lower side. Furthermore, the part dividing unit 303 sets the remaining resion as a candidate for a lower lower back part.

In addition, the part dividing unit 303 sets a midpoint of the straight line LCD as a second joint J2, and sets a midpoint of the straight line LEF as a third joint J3.

Note that, when the bending points FC to FF cannot be searched for, the part dividing unit 303 divides the trunk part in a longitudinal direction into three equal parts and sets the three equal parts as a candidate for the chest part, the upper lower back part P3, and a candidate for the lower lower back part, respectively, in order from the upper side. In this case, the part dividing unit 303 sets midpoints of two dividing lines used for the division into three equal parts, as the second and third joints J2 and J3, respectively.

Subsequently, the part dividing unit 303 determines two resions having a smaller width size Ds3 than the width size Ds1 of the head part P1 among the three branched resions located directly below the head part P1, to be candidates for the left and right arm parts, respectively.

Here, the part dividing unit 303 searches for two bent bending points FG and FH, based on the outlines (feature points F) of the candidate for the chest part and the candidate for the left arm part. Then, the part dividing unit 303 distinguishes the left arm part from the candidate for the chest part by a straight line LGH connecting the two bending points FG and FH.

In addition, the part dividing unit 303 sets a midpoint of the straight line LGH as an eighth joint J8.

Furthermore, the part dividing unit 303 searches for two bent bending points FI and FJ, based on the outline (feature points F) of the left arm part. Then, the part dividing unit 303 sets, as a left upper elbow part P9, a resion of the left arm part that is more on the side of the candidate for the chest part than a straight line LIJ connecting the bending points FI and FJ, and sets the other resion as a left lower elbow part P11.

In addition, the part dividing unit 303 sets a midpoint of the straight line LIJ as a tenth joint J10.

Note that, when the bending points FI and FJ cannot be searched for, the part dividing unit 303 divides the left arm part in an extending direction of the left arm part into two equal parts and sets the two equal parts as the left upper elbow part P9 and the left lower elbow part P11, respectively, in order from the side closer to the candidate for the chest part. In this case, the part dividing unit 303 sets a midpoint of a dividing line used for the division into two equal parts, as the tenth joint J10.

A method of distinguishing a right arm part from the candidate for the chest part, a method of dividing into a right upper elbow part P10 and a right lower elbow part P12, and a method of setting the ninth and eleventh joints J9 and J11 are the same as the above-described method of distinguishing the left arm part from the candidate for the chest part, the above-described method of dividing into the left upper elbow part P9 and the left lower elbow part P11, and the above-described method of setting the eighth and tenth joints J8 and J10, respectively, and thus a description thereof is omitted.

After distinguishing the left and right arm parts in the above-described manner, the part dividing unit 303 sets, as a chest part P2, a resion located directly below the head part P1 and surrounded by the straight lines LCD, LGH, etc.

Subsequently, the part dividing unit 303 determines two branched resions located directly below the candidate for the lower lower back part to be candidates for the left and right leg parts, respectively.

Here, the part dividing unit 303 searches for two bent bending points FK and FL, based on the outlines (feature points F) of the candidate for the lower lower back part and the candidate for the left leg part. Then, the part dividing unit 303 distinguishes the left leg part from the candidate for the lower lower back part by a straight line LKL connecting the two bending points FK and FL.

In addition, the part dividing unit 303 sets a midpoint of the straight line LKL as a fourth joint J4.

Furthermore, the part dividing unit 303 searches for two bent bending points FM and FN, based on the outline (feature points F) of the left leg part. Then, the part dividing unit 303 sets, as a left upper knee part P5, a resion of the left leg part that is more on the side of the candidate for the lower lower back part than a straight line LMN connecting the bending points FM and FN, and sets the other resion as a left lower knee part P7.

In addition, the part dividing unit 303 sets a midpoint of the straight line LMN as a sixth joint J6.

Note that, when the bending points FM and FN cannot be searched for, the part dividing unit 303 divides the left leg part in an extending direction of the left leg part into two equal parts and sets the two equal parts as the left upper knee part P5 and the left lower knee part P7, respectively, in order from the side closer to the candidate for the lower lower back part. In this case, the part dividing unit 303 sets a midpoint of a dividing line used for the division into two equal parts, as the sixth joint J6.

A method of distinguishing a right leg part from the candidate for the lower lower back part, a method of dividing into a right upper knee part P6 and a right lower knee part P8, and a method of setting the fifth and seventh joints J5 and J7 are the same as the above-described method of distinguishing the left leg part from the candidate for the lower lower back part, the above-described method of dividing into the left upper knee part P5 and the left lower knee part P7, and the above-described method of setting the fourth and sixth joints J4 and J6, respectively, and thus a description thereof is omitted.

After distinguishing the left and right leg parts in the above-described manner, the part dividing unit 303 sets, as a lower lower back part P4, a resion located directly below the upper lower back part P3 and surrounded by the straight lines LEF, LKL, etc.

Then, after the above-described processes, the part dividing unit 303 outputs information about the positions (pixel positions) occupied by the parts P1 to P12 of the person's image O contained in the image data, respectively, and information about the positions (pixel positions) of the first to eleventh joints J1 to J11, to the SDRAM 26 through the bus 29.

That is, in the above, part division is performed using position information about joints or junctions between bones which are estimated from a skeletal structure specific to the human body (application to animals is also possible), using a database that records the features of the positions and sizes of the bones (distances with reference to the face or head part) and the range of movement of the bones. At this time, the direction of gravity for when the subject image stands, and the position of each human body part from a specific resion, such as there is a body below a face from the top and bottom of the face, are estimated by a predetermined program.

Such a database like a map of the human body may be recorded in the recording medium 24. For familiar animals, insects, pets, etc., such as birds, dogs, cats, and turtles, other than humans, too, likewise, if a database thereof or a dictionary therefor is provided, then it is possible to determine which part is present at which one of the left, right, top, and bottom sides of a predetermined resion.

Referring back to FIG. 8, after step S118F, the angle calculating unit 304 calculates straight lines L1 to L12 (see FIG. 3), based on the information about the positions (pixel positions) of the first to eleventh joints J1 to J11 of the person's image O which is stored in the SDRAM 26 (step S118F). In addition, the angle calculating unit 304 calculates angles formed by each pair of adjacent parts of the person's image O, based on the calculated straight lines L1 to L12 (step S118G). Then, the angle calculating unit 304 outputs information about the angles formed by each pair of adjacent parts of the person's image O contained in the image data, to the SDRAM 26 through the bus 29.

In the following, the information about the positions occupied by the parts P1 to P12 of the person's image O, the information about the positions of the first to eleventh joints J1 to J11, and the information about the angles formed by each pair of adjacent parts are described as information about the person's image O.

Subsequently, the imaging control unit 301 reads the information about the specified pose and the information about the person's image O which are stored in the SDRAM 26 (step S104 and S118G) and compares the information about the specified pose with the information about the person's image O for a corresponding pair of parts. Then, the imaging control unit 301 determines whether the angle formed by each pair of parts included in the information about the person's image O falls within a predetermined angle range where the angle formed by a corresponding pair of parts included in the information about the specified pose is the center of the range (whether the posture of the person's image O is the same as or similar to the specified pose) (step S118H).

If it is determined that the posture of the person's image O is not the same as or similar to the specified pose (step S118H: No), the control unit 30 ends the pose shooting process.

Thereafter, the imaging apparatus 1 returns to the main routine illustrated in FIG. 5.

On the other hand, if it is determined that the posture of the person's image O is the same as or similar to the specified pose (step S118H: Yes), the imaging control unit 301 performs mechanical shutter shooting by driving the shutter driving unit 11 and the imaging device driving unit 13 (step S118I). Image data that is generated by the imaging device 12 by the mechanical shutter shooting is outputted to the signal processing unit 14, the A/D converting unit 15, and the SDRAM 26 through the bus 29. Then, the image data is stored in the SDRAM 26 so as to be associated with the information about the person's image O.

Subsequently, the control unit 30 performs a rec view display process for allowing the display unit 21 to display a rec view image corresponding to the image data containing the person's image O which is generated by the imaging device 12 by the mechanical shutter shooting (step S118J).

Note that the details of the rec view display process (step S118J) will be described later.

Thereafter, the imaging control unit 301 allows the image compressing/decompressing unit 19 to compress the image data in the recording format set in the setting process at step S104, and records the compressed image data in the recording medium 24 (step S118K: imaging controlling step). Then, the imaging apparatus 1 returns to the main routine illustrated in FIG. 5.

Note that the imaging control unit 301 may allow the recording medium 24 to record the image data compressed in the above-described recording format by the image compressing/decompressing unit 19, such that the image data is associated with RAW data that has not been subjected to image processing by the image processing unit 16.

Rec View Display Apparatus

Figure 10:
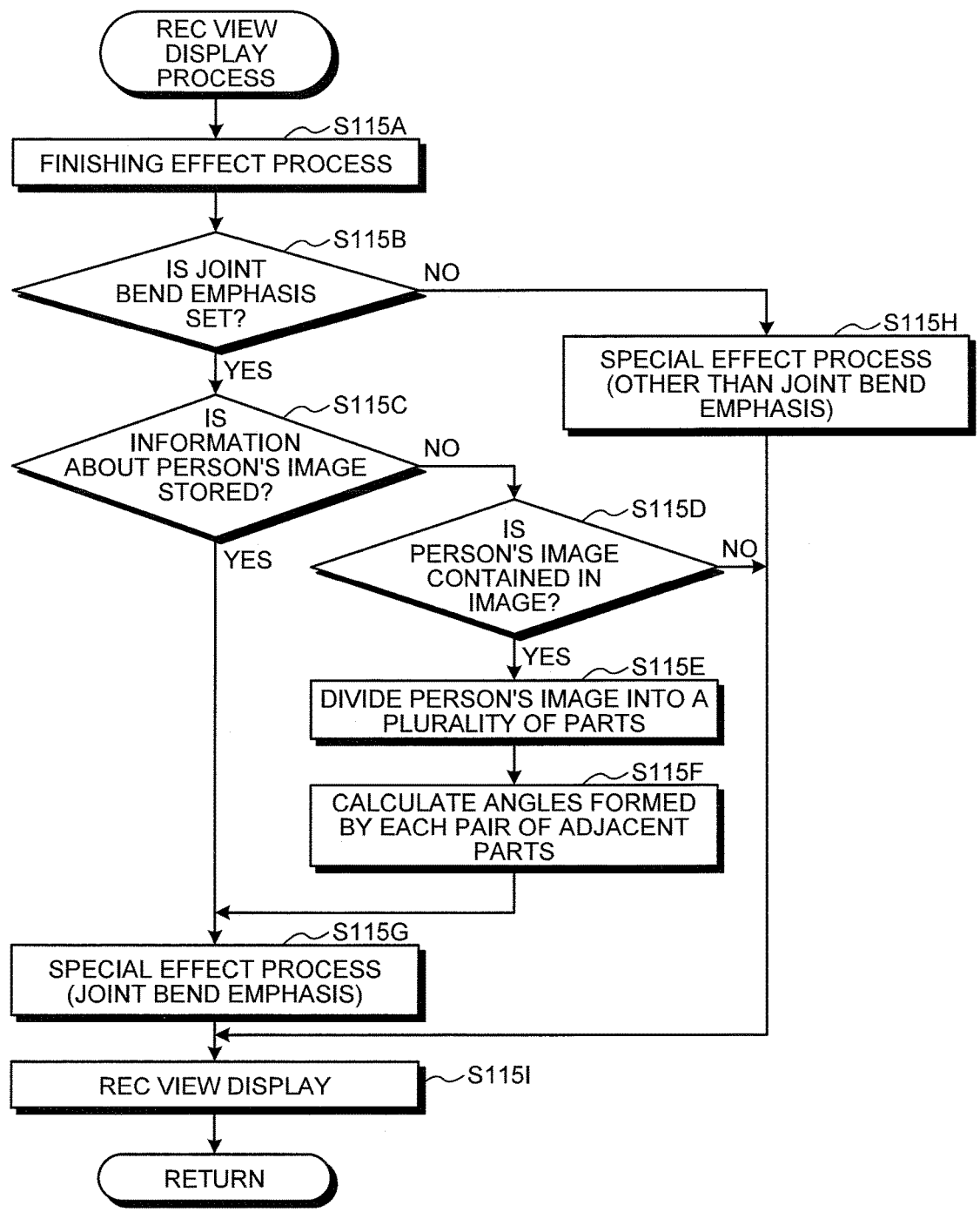
FIG. 10 is a flowchart illustrating a summary of a rec view display process (step S115 and S118J) illustrated in FIGS. 5 and 8.

FIG. 10 is a flowchart illustrating a summary of a rec view display process.

Next, the rec view display process (step S115) illustrated in FIG. 5 and the rec view display process (step S118J) illustrated in FIG. 8 will be described based on FIG. 10.

The image processing control unit 305 allows the basic image processing unit 161 to perform a finishing effect process corresponding to the processing item (the processing item selected on the finishing effect process selection screen W3) which is set by the image processing setting unit 302 (step S104), on the image data stored in the SDRAM 26 (step S114 and S118I) (step S115A). Then, the finishing effect image data having been subjected to the finishing effect process by the basic image processing unit 161 is outputted to the SDRAM 26 through the bus 29. Note that, when the image data obtained before the finishing effect process is associated with the information about the person's image O, the finishing effect image data obtained after the finishing effect process is stored in the SDRAM 26 so as to be also associated with the information about the person's image O.

Subsequently, the control unit 30 determines, based on the information stored in the SDRAM 26, whether the processing item of the special effect process set at step S104 (the processing item selected on the special effect process selection screen W4) is "joint bend emphasis" (step S115B).

If it is determined that the set processing item of the special effect process is "joint bend emphasis" (step S115B: Yes), the control unit 30 determines whether information about the person's image O (information associated with the finishing effect image data) is stored in the SDRAM 26 (step S115C).

If it is determined that information about the person's image O is not stored in the SDRAM 26 (step S115C: No), the control unit 30 performs step S115D to S115F.

On the other hand, if it is determined that information about the person's image O is stored in the SDRAM 26 (step S115C: Yes), the imaging apparatus 1 transitions to step S115G.

Note that the case in which information about the person's image O is not stored in the SDRAM 26 is the case in which a rec view display process (step S115) is performed in the normal still image shooting mode. In addition, the case in which information about the person's image O is stored in the SDRAM 26 is the case in which information about the person's image O is already calculated at step S118F and S118G in the pose shooting mode.

Step S115D to S115F which are performed when a rec view display process (step S115) is performed in the normal still image shooting mode will be described.

As with step S118E, the part dividing unit 303 determines whether a person's image O is contained in the finishing effect image data generated at step S115A (step S115D).

If it is determined that a person's image O is not contained in the finishing effect image data (step S115D: No), the imaging apparatus 1 transitions to step S115I.

On the other hand, if it is determined that a person's image O is contained in the finishing effect image data (step S115D: Yes), as with step S118F, the part dividing unit 303 divides the person's image O into a plurality of parts (step S115E: part dividing step).

Then, the part dividing unit 303 allows the SDRAM 26 to store information about positions (pixel positions) occupied by the parts P1 to P12 of the person's image O contained in the finishing effect image data and information about the positions (pixel positions) of the first to eleventh joints J1 to J11, such that those pieces of information are associated with the finishing effect image data.

Subsequently, as with step S118G, the angle calculating unit 304 calculates angles formed by each pair of adjacent parts of the person's image O (step S115F). Then, the angle calculating unit 304 allows the SDRAM 26 to store information about the angles formed by each pair of adjacent parts of the person's image O contained in the finishing effect image data, such that the information is associated with the finishing effect image data. Thereafter, the imaging apparatus 1 transitions to step S115G.

Figure 11:
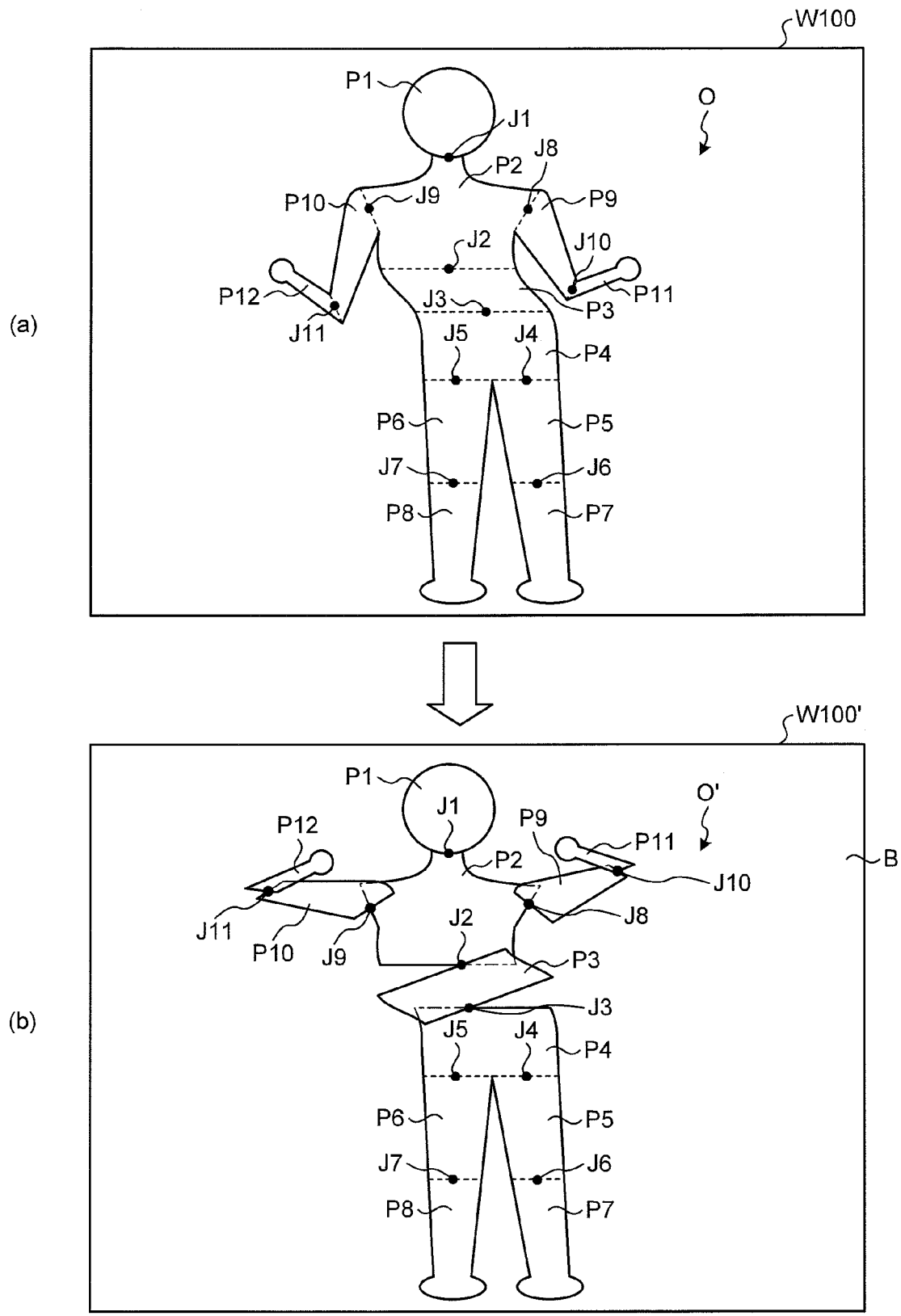
FIG. 11 is a diagram for describing step S115G (special effect process (joint bend emphasis)) illustrated in FIG. 10.

FIG. 11 is a diagram for describing step S115G (special effect process (the processing item of "joint bend emphasis")).

Specifically, (a) of FIG. 11 illustrates an image W100 corresponding to finishing effect image data obtained before subjected to a special effect process (the processing item of "joint bend emphasis"). (b) of FIG. 11 is an image W100' (an image in which a person's image O' is combined with a background image B) corresponding to composite image data obtained after a special effect process (the processing item of "joint bend emphasis") is performed on the finishing effect image data.

If it is determined that information about the person's image O is stored in the SDRAM 26 (step S115C: Yes), or after step S115F, the image processing control unit 305 allows, as shown below, the special image processing unit 162 to perform a special effect process corresponding to "joint bend emphasis" on the finishing effect image data (step S115G: changed-image data generating step).

Based on the information about the person's image O (information about the positions occupied by the parts P1 to P12 of the person's image O) stored in the SDRAM 26 (step S118F, S118G, S115E, and S115F), the special image processing unit 162 reads image data for the area of the person's image O in the finishing effect image data, from the SDRAM 26 through the bus 29.

Subsequently, the special image processing unit 162 compares the information about the person's image O (the information about the angles formed by each pair of adjacent parts of the person image O) stored in the SDRAM 26, with association information recorded in the flash memory 27 to grasp pairs of parts having a first angle included in the association information.

Subsequently, the special image processing unit 162 creates a person's image O' (corresponding to changed-image data according to the present invention) where the angles formed by each pair of parts having the first angle included in the association information are changed to a second angle associated with the first angle, based on the information about the positions occupied by the parts P1 to P12 of the person's image O and the association information.

Here, when the special image processing unit 162 creates a person's image O', the special image processing unit 162 uses the information about the person's image O stored in the SDRAM 26 (the information about the positions of the first to eleventh joints J1 to J11 of the person's image O) and setting information recorded in the flash memory 27, in addition to the above-described information.

Specifically, the special image processing unit 162 creates a person's image O' by setting, based on the setting information, one of a pair of parts having the first angle as a fixed part, and the other one as a position change part, and rotating the position change part about a joint that connects the pair of parts, so as to obtain the second angle.

When the person's image O contained in the finishing effect image data has a posture illustrated in (a) of FIG. 11, six pairs of a chest part P2 and an upper lower back part P3, the upper lower back part P3 and a lower lower back part P4, the chest part P2 and a left upper elbow part P9, the chest part P2 and a right upper elbow part P10, the left upper elbow part P9 and a left lower elbow part P11, and the right upper elbow part P10 and a right lower elbow part P12 are grasped as pairs of parts having the first angle.

Here, for example, for the chest part P2 and the upper lower back part P3, based on the setting information, the upper lower back part P3 is set as a fixed part and the chest part P2 as a position change part. Then, the chest part P2 (including parts P1 and P9 to P12 connected to the chest part P2) is allowed to rotate about a second joint J2 with respect to the upper lower back part P3 such that the angle formed by the chest part P2 and the upper lower back part P3 has the second angle.

Then, for other pairs than that of the chest part P2 and the upper lower back part P3, too, in the same manner as that described above, the position change part is allowed to rotate with respect to the fixed part, by which a person's image O' is created ((b) of FIG. 11).

Subsequently, the special image processing unit 162 combines the created person's image O' with a background image B (background image data) recorded in the flash memory 27, and thereby generates composite image data (image W100' ((b) of FIG. 11)). Then, the special image processing unit 162 outputs the composite image data to the SDRAM 26 through the bus 29. Thereafter, the imaging apparatus 1 ends the special effect process corresponding to "joint bend emphasis" performed by the special image processing unit 162, and transitions to step S115I.

Referring back to step S115B, if it is determined that the set processing item of the special effect process is not "joint bend emphasis" (step S115B: No), the image processing control unit 305 performs the following process (step S115H).

At step S115H, the image processing control unit 305 allows the special image processing unit 162 to perform a special effect process corresponding to the processing item set by the image processing setting unit 302 (step S104) (the processing item selected on the special effect process selection screen W4 (a processing item other than "joint bend emphasis")), on the finishing effect image data stored in the SDRAM 26 (step S115A). Thereafter, the imaging apparatus 1 transitions to step S115I.

Note that the configuration may be such that step S115H is performed after step S115G, i.e., a special effect process corresponding to a processing item other than "joint bend emphasis" is performed on the composite image data stored in the SDRAM 26.

At step S115I, the display control unit 306 allows the display unit 21 to display a rec view image corresponding to the image data having been subjected to the image processing by the image processing unit 16. Thereafter, the imaging apparatus 1 returns to the main routine illustrated in FIG. 5.

For example, at step S115I, when a special effect process corresponding to "joint bend emphasis" is performed (step S115G) (when composite image data is stored in the SDRAM 26), the display control unit 306 allows the display unit 21 to display a rec view image corresponding to the composite image data (e.g., the image W100' illustrated in (b) of FIG. 11).

Note that the display unit 21 may be allowed to display a rec view image corresponding to finishing effect image data obtained before subjected to a special effect process (the processing item of "joint bend emphasis") (e.g., the image W100 illustrated in (a) of FIG. 11) and a rec view image corresponding to composite image data (e.g., the image W100' illustrated in (b) of FIG. 11) such that the rec view images are switched every predetermined period of time.

In addition, at step S115I, when a special effect process other than "joint bend emphasis" is performed (step S115H), the display control unit 306 allows the display unit 21 to display a rec view image (not illustrated) corresponding to image data on which the special effect process has been performed.

Live View Display Process

Figure 12:
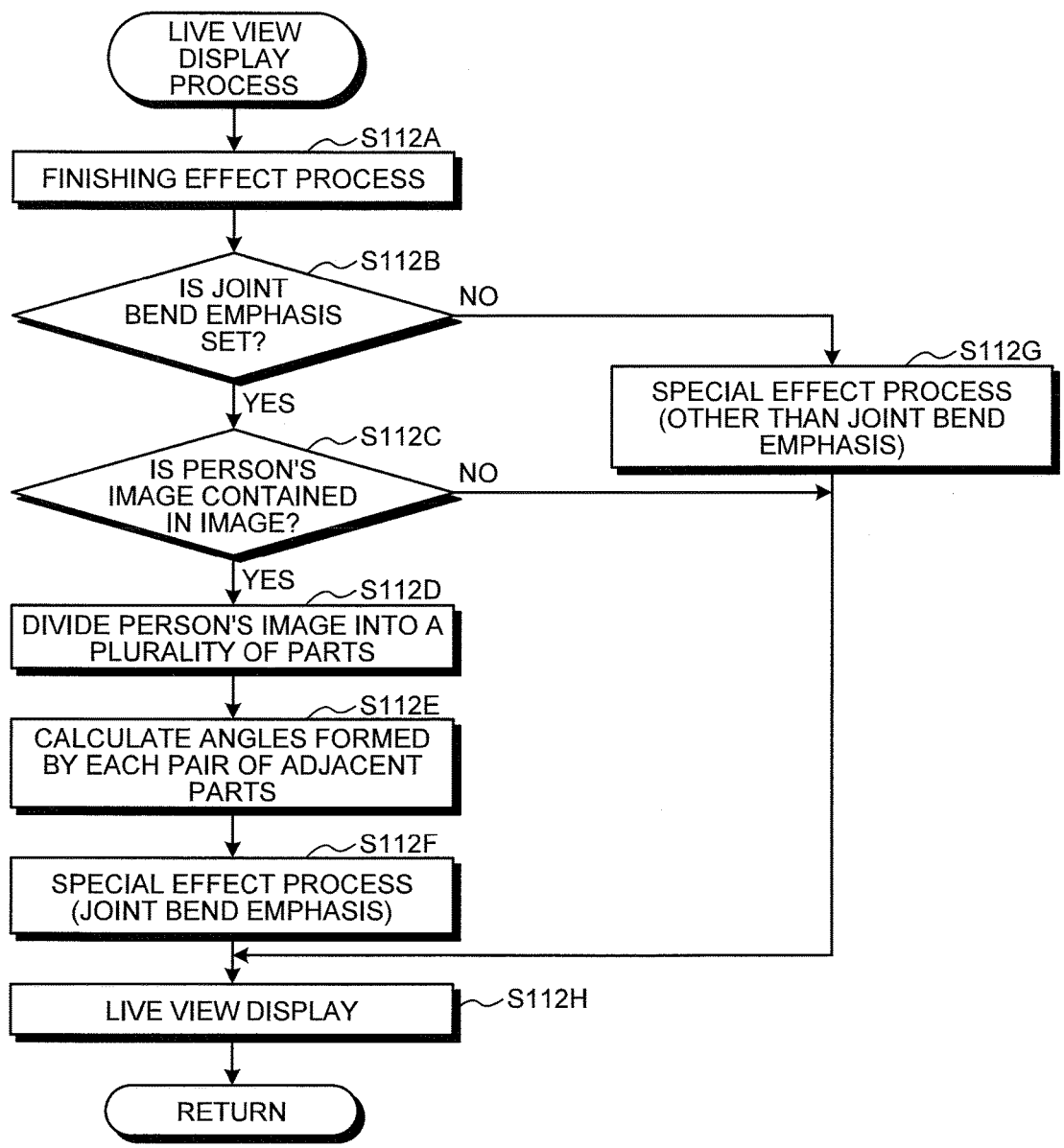
FIG. 12 is a flowchart illustrating a summary of a live view display process (step S112 and S121) illustrated in FIG. 5.

FIG. 12 is a flowchart illustrating a summary of a live view display process.

Next, a live view display process (step S112 and S121) illustrated in FIG. 5 will be described based on FIG. 12.

The image processing control unit 305 allows the basic image processing unit 161 to perform a finishing effect process on the image data that is stored in the SDRAM 26 by electronic shutter shooting (step S111 and S120), in the same manner as that at step S115A (step S112A). The finishing effect image data generated by the basic image processing unit 161 is outputted to the SDRAM 26 through the bus 29.

Subsequently, as with step S115B, the control unit 30 determines whether the processing item of the special effect process set at step S104 is "joint bend emphasis" (step S112B).

If it is determined that the set processing item of the special effect process is "joint bend emphasis" (step S112B: Yes), as with step S115D, the control unit 30 determines whether a person's image O is contained in the finishing effect image data generated at step S112A (step S112C).

If it is determined that a person's image O is not contained in the finishing effect image data (step S112C: No), the imaging apparatus 1 transitions to step S112H.

On the other hand, if it is determined that a person's image O is contained in the finishing effect image data (step S112C: Yes), the control unit 30 performs step S112D (part dividing step) to S112F (changed-image data generating step) which are the same as step S115E to S115G. Thereafter, the imaging apparatus 1 transitions to step S112H.

Referring back to step S112B, if it is determined that the set processing item of the special effect process is not "joint bend emphasis" (step S112B: No), the control unit 30 performs step S112G which is the same as step S115H. Thereafter, the imaging apparatus 1 transitions to step S112H.

At step S112H, the display control unit 306 allows the display unit 21 to display a live view image corresponding to the image data having been subjected to the image processing by the image processing unit 16. Thereafter, the imaging apparatus 1 returns to the main routine illustrated in FIG. 5.

For example, at step S112H, when a special effect process corresponding to "joint bend emphasis" is performed (step S112F) (when composite image data is stored in the SDRAM 26), the display control unit 306 allows the display unit 21 to display a live view image corresponding to the composite image data.

Note that the display unit 21 may be allowed to display a live view image corresponding to finishing effect image data obtained before subjected to a special effect process (the processing item of "joint bend emphasis") and a live view image corresponding to composite image data side by side.

In addition, at step S112H, when a special effect process other than "joint bend emphasis" is performed (step S112G), the display control unit 306 allows the display unit 21 to display a live view image corresponding to image data on which the special effect process has been performed.

Note that finishing effect image data to be processed at step S112C to S112G is switched in accordance with a display frame rate at which the display control unit 306 allows the display unit 21 to display a live view image. Namely, step S112C to S112G are completed before a live view image for the next frame is displayed. Hence, for example, on the display unit 21, a live view image corresponding to image data obtained by performing image processing (step S112F and S112G) on finishing effect image data for the first frame is displayed, and then, a live view image corresponding to image data obtained by performing image processing (step S112F and S112G) on finishing effect image data for the second frame is displayed.

In the first embodiment described above, the imaging apparatus 1 divides a person's image O contained in image data into a plurality of parts P1 to P12, to create a person's image O' where the positional relationship between the plurality of parts is changed.

Therefore, the posture of the person's image O can be changed by a special effect process (the processing item of "joint bend emphasis"), enabling to create highly amusing images.

In addition, in the first embodiment, the imaging apparatus 1 calculates angles formed by each pair of adjacent parts of a person's image O. Then, the imaging apparatus 1 creates a person's image O' (changed-image data) where the angles formed by each pair of adjacent parts are changed to a second angle associated with the calculated angles (first angle), based on association information.

In particular, the association information is such that a first angle is set to an angle larger than 0° and a second angle associated with the first angle is set to an angle larger than the first angle.

Hence, by bending a joint that is bent to a certain extent (first angle) at a larger angle (second angle), the posture of the person's image O can be changed to an eccentric one ignoring the human body structure. Namely, the posture of the person's image O can be changed to one that an ordinary person cannot take, by a special effect process (the processing item of "joint bend emphasis"), enabling to create extremely highly amusing images.

In addition, in the first embodiment, the imaging apparatus 1 sets, based on setting information, one of a pair of adjacent parts as a fixed part and the other one as a position change part, and creates a person's image O' where the position of the position change part is changed with respect to the fixed part.

In particular, the setting information is such that one of a pair of adjacent parts with reference to the lower lower back part P4 present in the lower body is set as a fixed part and the other one as a position change part.

By thus using the lower body (lower lower back part P4) as a reference part, for example, when the person's image O is in a standing posture and the upper body is in a bending posture, even in the person's image O' created by a special effect process (the processing item of "joint bend emphasis"), a posture where the way the upper body is bent is emphasized can be taken while the standing posture is maintained. In addition, by using the lower lower back part P4 as a reference part, the way both arms and legs, the head part P1, the chest part P2, and the upper lower back part P3 are bent can be emphasized without displacing the position of the lower lower back part P4 (a substantially central position of the person's image O).

In addition, in the first embodiment, while the imaging apparatus 1 displays an avatar image A61 on the display unit 21, the imaging apparatus 1 sets a specified pose, according to a user's touch operation performed on the displayed avatar image A61 (setting process for various types of conditions (step S104)). Then, the imaging apparatus 1 performs automatic shooting when a subject strikes the specified pose (pose shooting process (step S118)).

Namely, by the user presetting a pose to be shot as a specified pose, automatic shooting is performed only by striking the specified pose. Hence, when a pose to be shot in advance is a peculiar one (e.g., a pose where a subject jumps up with his/her arms and legs bent), a captured image where the subject strikes the desired pose can be obtained without missing a photo opportunity.

Second Embodiment

Next, a second embodiment of the present invention will be described.

In the following description, the same configurations and steps as those in the above-described first embodiment are denoted by the same reference signs, and a detailed description thereof is omitted or simplified.

In the above-described first embodiment, in a live view display process (step S112 and S121), the way a joint is bent is emphasized using association information recorded in the flash memory 27, such that a junction bent at a first angle is bent at a second angle associated with the first angle (step S112F (special effect process (the processing item of "joint bend emphasis"))).

On the other hand, in a live view display process according to the second embodiment, a joint whose way of bending changes chronologically is identified without using association information, and the way the joint is bent is emphasized.

Configuration of an Imaging Apparatus

Figure 13:
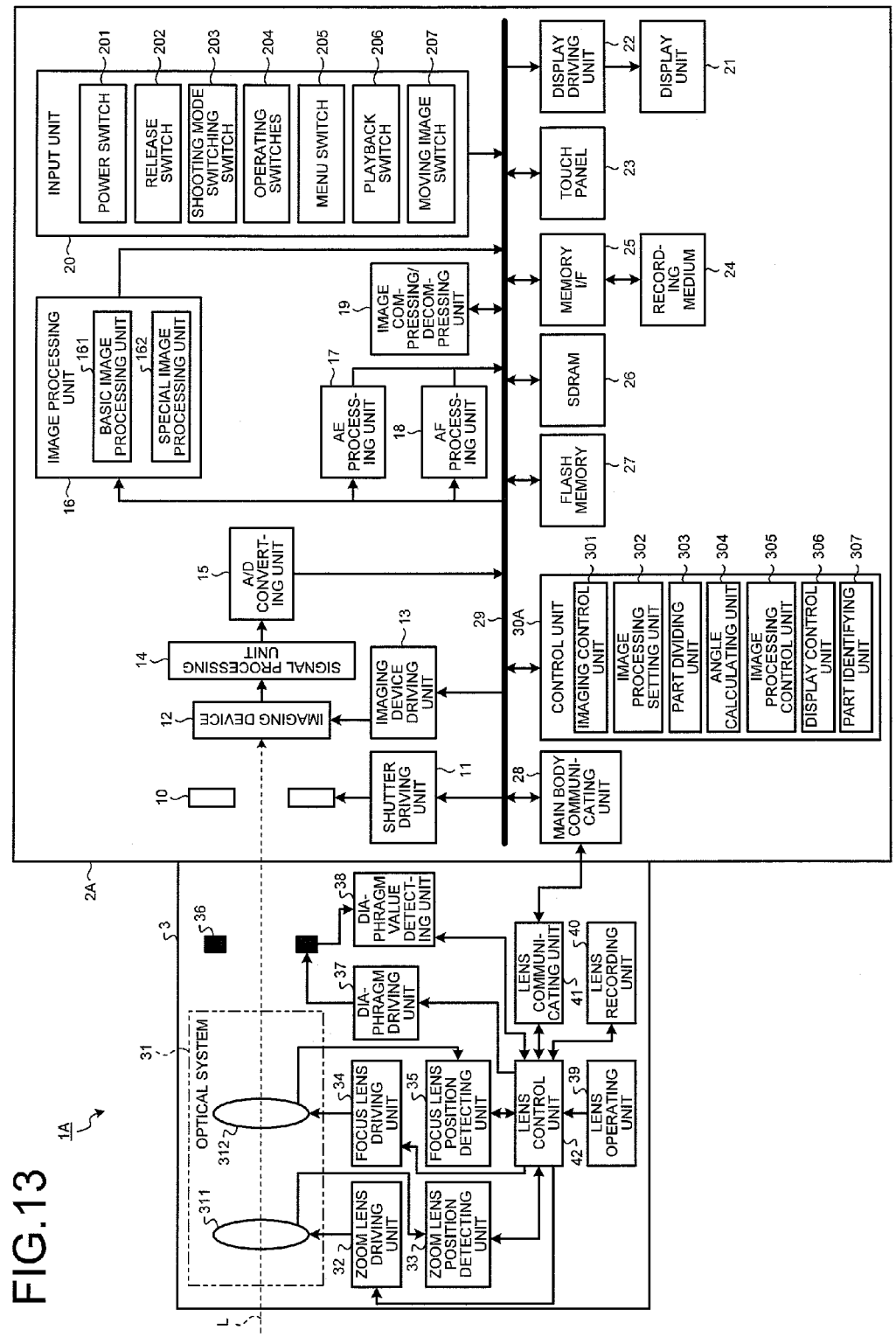
FIG. 13 is a block diagram illustrating a configuration of an imaging apparatus according to a second embodiment of the present invention.

FIG. 13 is a block diagram illustrating a configuration of an imaging apparatus 1A according to the second embodiment of the present invention.

Compared to the imaging apparatus 1 of the above-described first embodiment (FIG. 2), in the imaging apparatus 1A (main body unit 2A) according to the second embodiment, association information is not recorded in a flash memory 27. In addition, as illustrated in FIG. 13, a part identifying unit 307 is added to the imaging apparatus 1A (control unit 30A). Other configurations are the same as those of the above-described first embodiment.

The part identifying unit 307 identifies a pair of adjacent parts, the angle between which changes chronologically, by comparing parts of a person's image into which finishing effect image data of the immediately previous frame is divided by a part dividing unit 303 with parts of a person's image into which finishing effect image data of the current frame is divided by the part dividing unit 303.

In addition, an image processing control unit 305 according to the second embodiment allows a special image processing unit 162 to generate changed-image data where the angle formed by the pair of parts identified by the part identifying unit 307 is changed in a direction in which the angle changes chronologically.

Operation of the Imaging Apparatus

The operation of the imaging apparatus 1A according to the second embodiment differs from the operation of the imaging apparatus 1 of the above-described first embodiment (FIG. 5) in the processing details of a live view display process (step S112 and S121). Hence, in the following, only the differences will be described.

Live View Display Process

Figure 14:
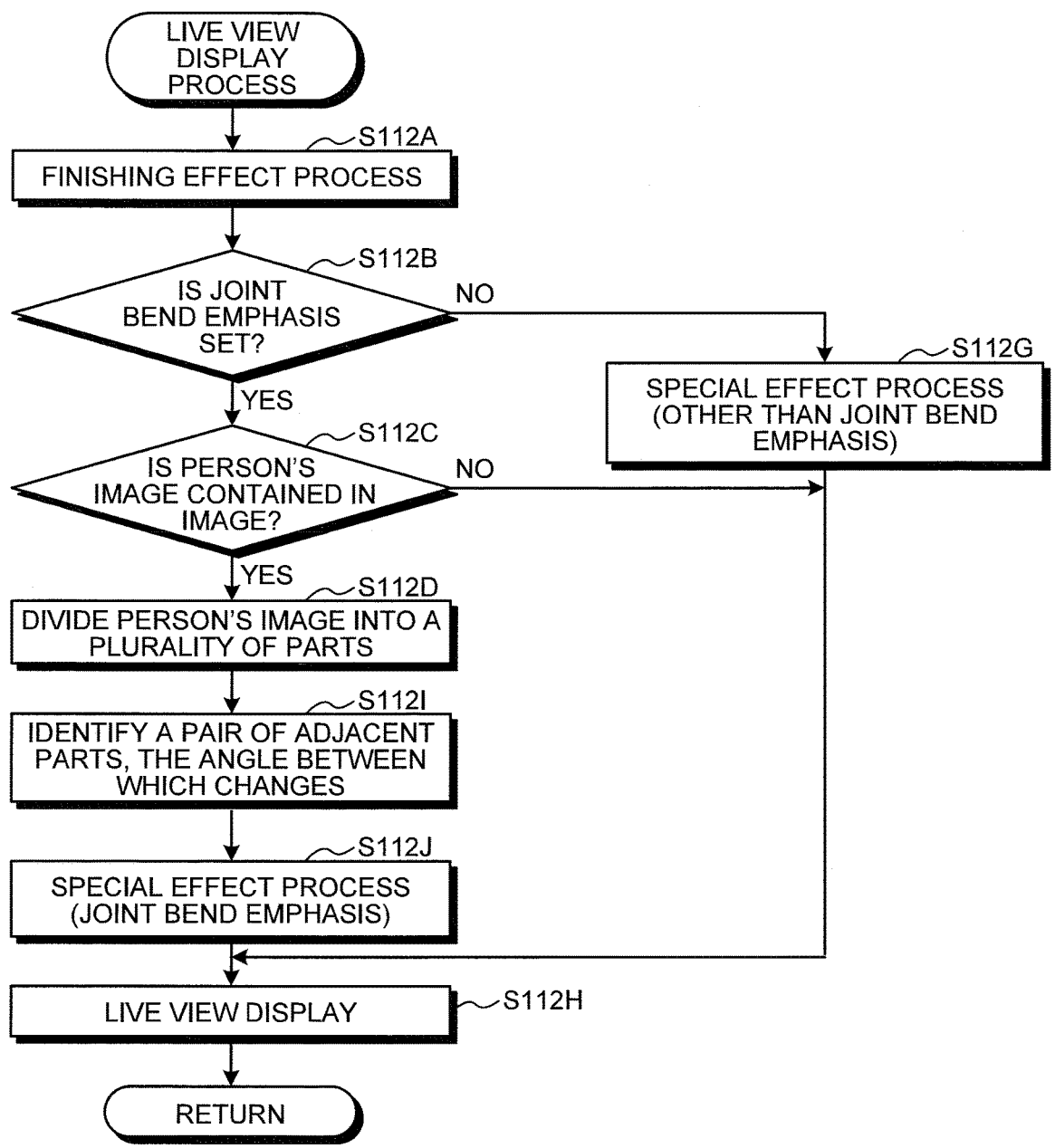
FIG. 14 is a flowchart illustrating a summary of a live view display process according to the second embodiment of the present invention.

FIG. 14 is a flowchart illustrating a summary of a live view display process according to the second embodiment of the present invention.

Note that, compared to a live view display process described in the first embodiment (FIG. 12), in the live view display process according to the second embodiment of the present invention, as illustrated in FIG. 14, step S112E is omitted and step S112I is added. Note also that in the live view display process according to the second embodiment of the present invention, step S112J is performed instead of step S112F. Other processing details are the same as those of the above-described first embodiment.

Figure 15:
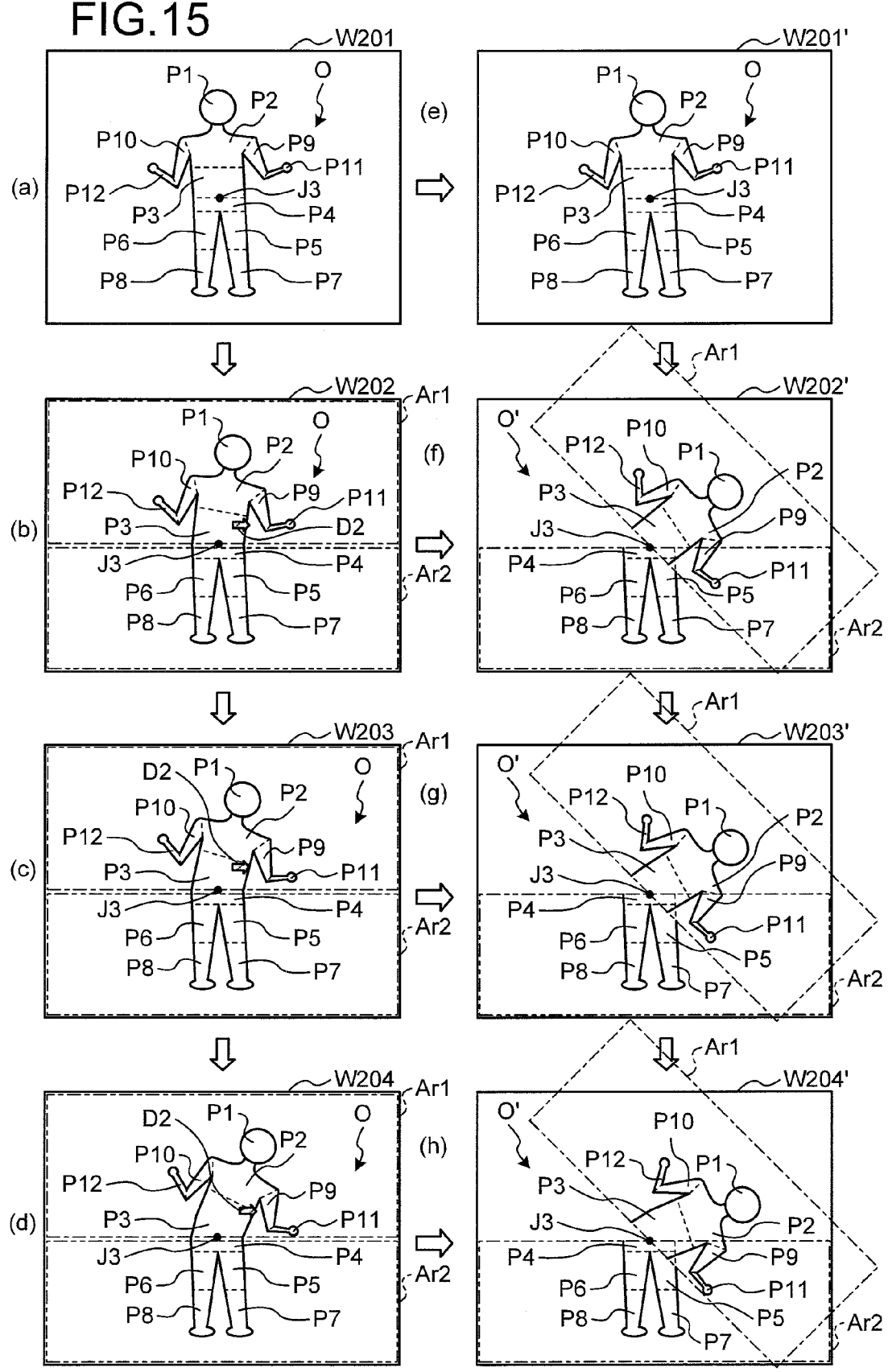
FIG. 15 is a diagram for describing step S112I and S112J illustrated in FIG. 14.

FIG. 15 is a diagram for describing step S112I and S112J.

Specifically, (a) to (d) of FIG. 15 illustrate images W201 to W204 corresponding to finishing effect image data of the first to fourth frames, respectively, which are obtained before step S112J (special effect process (the processing item of "joint bend emphasis")) is performed. (e) of FIG. 15 illustrates an image W201' which is the same as that illustrated in (a) of FIG. 15. (f) to (h) of FIG. 15 illustrate images W202' to W204' corresponding to image data of the second to fourth frames, respectively, which are obtained after step S112J is performed on the finishing effect image data.

Note that (a) to (d) of FIG. 15 illustrate a person's image O where the person's image O having a posture where it stands upright with the body facing the front and both elbows are bent with both arms detached from the body gradually leans its upper body (upper than a third joint J3) leftward.

Step S112I is performed after step S112D.

In the following, information about a person's image O which is stored in an SDRAM 26 by performing step S112D on finishing effect image data of the immediately previous frame (information about positions occupied by the parts P1 to P12 of the person's image O and information about the positions of the first to eleventh joints J1 to J11) is described as information about the person's image O of the immediately previous frame. In addition, information about a person's image O which is stored in the SDRAM 26 by performing step S112D on finishing effect image data of the current frame is described as information about the person's image O of the current frame.

At step S112I, the part identifying unit 307 identifies a pair of adjacent parts, the angle between which changes chronologically, by comparing the information about the person's image O of the immediately previous frame stored in the SDRAM 26 with the information about the person's image O of the current frame for corresponding pairs of adjacent parts. Then, information about the identified pair of parts and information about a direction in which the angle formed by the pair of parts changes chronologically are outputted to the SDRAM 26 through a bus 29.

For example, in the example illustrated in FIG. 15, when the current frame is the second frame, by comparing the positions occupied by the plurality of parts P1 to P12 of the person's image O of the first frame ((a) of FIG. 15) with the positions occupied by the plurality of parts P1 to P12 of the person's image O of the current frame (second frame) ((b) of FIG. 15), it can be grasped that the upper body (parts P1 to P3 and P9 to P12) has changed in a clockwise direction D2 ((b) of FIG. 15) with the third joint J3 being the center.

Hence, the part identifying unit 307 identifies the upper lower back part P3 and the lower lower back part P4 as a pair of adjacent parts, the angle between which changes chronologically, and outputs information about the identified pair of parts P3 and P4 and information about the direction D2 in which the angle formed by the pair of parts P3 and P4 changes chronologically, to the SDRAM 26 through the bus 29.

At step S112J (changed-image data generating step), as shown below, the image processing control unit 305 allows the special image processing unit 162 to perform a special effect process corresponding to "joint bend emphasis" on finishing effect image data.

The special image processing unit 162 divides the entire image area in finishing effect image data stored in the SDRAM 26 (step S112A) by a dividing line passing through a joint that connects the pair of parts identified at step S112I into two areas: an area including one part and an area including the other part.

Subsequently, the special image processing unit 162 reads image data for one of the two areas, based on setting information recorded in the flash memory 27. In addition, based on the information about the direction in which the angle formed by the pair of parts changes chronologically which is stored in the SDRAM 26 (step S112I), the special image processing unit 162 generates rotated-image data where an image corresponding to the read image data is rotated in the direction in which the angle changes chronologically. Then, the special image processing unit 162 combines image data for the other area with the rotated-image data and thereby generates a composite image data (corresponding to changed-image data according to the present invention).

For example, in the example illustrated in (a) to (h) of FIG. 15, when the current frame is the second frame, the special image processing unit 162 divides the entire image area in finishing effect image data by a dividing line passing through the third joint J3 into an area Ar1 including the upper lower back part P3 (including the parts P1, P2, and P9 to P12 connected to the upper lower back part P3) ((b) of FIG. 15) and an area Ar2 including the lower lower back part P4 (including the parts P5 to P8 connected to the lower lower back part P4) ((b) of FIG. 15). In addition, the special image processing unit 162 reads image data for the area Ar1 including the upper lower back part P3 which is determined to be a position change part from the setting information, and generates rotated-image data where the image for the read image data is rotated in the direction D2 in which the angle changes chronologically with the third joint J3 being the center. Then, the special image processing unit 162 combines image data for the area Ar2 including the lower lower back part P4 which is determined to be a fixed part from the setting information, with the rotated-image data and thereby generates composite image data (the image W202' ((f) of FIG. 15)).

By performing the above step S112I and S112J, at step S112H, in the first frame, the image W201' ((e) of FIG. 15) that has not been subjected to a special effect process (the processing item of "joint bend emphasis") is displayed on a display unit 21, but in the second and subsequent frames, the images W202' to W204' where the way the joint is bent is emphasized in the images W202 to W204 ((f) to (h) of FIG. 15) are sequentially displayed on the display unit 21.

The second embodiment described above provides the following effect, in addition to the same effects as those provided by the above-described first embodiment.

In the second embodiment, the imaging apparatus 1A identifies a pair of adjacent parts, the angle between which changes chronologically, by comparing pieces of information about a person's image O of the immediately previous frame and the current frame. Then, the imaging apparatus 1A divides the entire image area in image data into an area including one of the identified pair of parts and an area including the other part, and generates composite image data where one of the areas is rotated in the direction in which the angle changes chronologically, with respect to the other area.

Hence, the step of calculating angles formed by each pair of adjacent parts (step S112E) can be omitted, and changed-image data can be generated without referring to an association information. Thus, the processing time from when image data is analyzed until composite image data is generated can be reduced.

Other Embodiments

Embodiments for carrying out the present invention have been described so far, but it is to be noted that the present invention is not limited to the above-described first and second embodiments.

In the above-described first and second embodiments, while an avatar image A61 is displayed on the display unit 21, a specified pose is set according to a user's touch operation performed on the displayed avatar image A61; however, the configuration is not limited thereto.

For example, on a pose specification screen W6, by using a person's image O contained in image data which is already shot and generated, instead of an avatar image A61, a specified pose may be set according to a user's touch operation performed on the person's image O.

Here, when, with the pose specification screen W6 containing the person's image O displayed on the display unit 21, the display position of the person's image O is touched on the touch panel 23 by a user's touch operation and then slid, the control unit 30 performs the same processes as those at the above-described step S115E (S112D) and S115G (S112F and S112J), to change the display position of the touched part of the person's image O.

Note that, when the control unit 30 performs the same processes as those at the above-described step S115G (S112F and S112J), the control unit 30 creates, using the direction in which the display position is slid and the amount of the slide, instead of association information and information about a direction in which an angle formed by a pair of adjacent parts changes chronologically, a person's image where the display position of the touched part is moved (rotated) in the slide direction by the amount of the slide.

In addition, the above-described first and second embodiments may adopt a configuration in which in a rec view display process (step S115 and S118J) the display unit 21 is allowed to display an image corresponding to image data (containing a person's image O') having been subjected to a special effect process (the processing item of "joint bend emphasis") and recorded in the recording medium 24 (step S116 and S118K), and the posture of the person's image O' is further changed according to a user's touch operation performed on the person's image O', as with the above-described specified pose setting.

Figure 16:
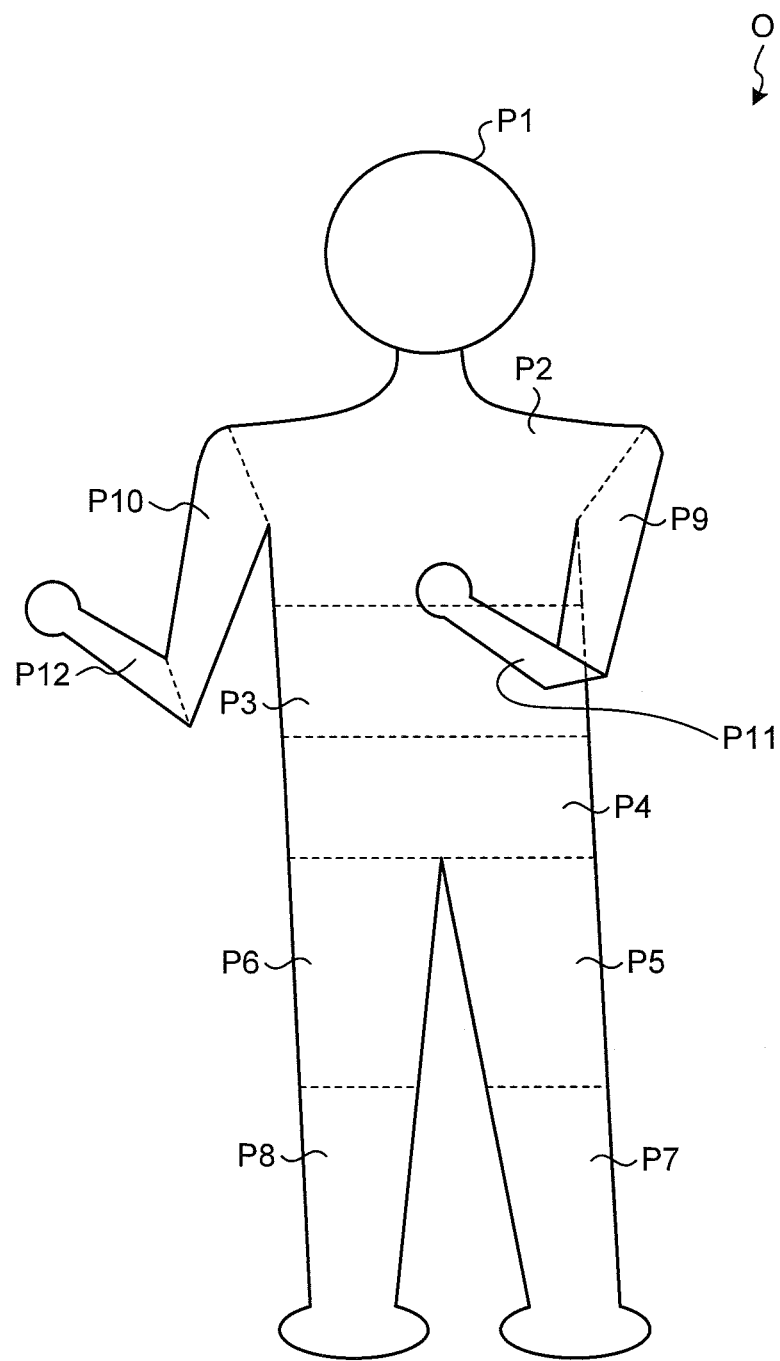
FIG. 16 is a diagram for describing a variant of the first and second embodiments of the present invention.

FIG. 16 is a diagram for describing a variant of the first and second embodiments of the present invention.

Although in the above-described first and second embodiments the part dividing unit 303 divides a person's image O into a plurality of parts P1 to P12 based on feature points F that determine the outline of the person's image O, the configuration is not limited thereto.

For example, when given parts of a person's image O are located on the front side (the side of the imaging apparatus 1, 1A) of other parts (in the example of FIG. 16, a left upper elbow part P9 and a left lower elbow part P11 are located on the front side of a chest part P2 and an upper lower back part P3), it is difficult to extract feature points F that determine the outlines of the given parts (in the example of FIG. 16, the left upper elbow part P9 and the left lower elbow part P11).

Hence, a configuration may be adopted in which distances from the imaging apparatus 1, 1A to each part are measured or calculated and those parts having different distances are determined to be different parts, by which the given parts are distinguished from the other parts.

Note that the methods of measuring or calculating distances from the imaging apparatus 1, 1A to each part include, for example, a method in which a range sensor or the like is provided separately to measure distances by the range sensor, and a method of calculating distances to each part based on each focus position by AF processing.

Although in the above-described first and second embodiments the part dividing unit 303 divides a person's image O into 12 parts P1 to P12, the number of divided parts may be smaller or larger than 12 as long as the person's image O is divided into at least two parts.

As such, the positions at which the human body is bent are estimated as joints or junctions between bones from the disposition of human body parts estimated from a database or dictionary for a skeletal structure specific to the human body, and a determination of individual parts using the joints or the junctions between bones is performed.

Although in the above-described first and second embodiments the setting information is such that one of a pair of adjacent parts with reference to the lower lower back part P4 is set as a fixed part and the other one is set as a position change part, the configuration is not limited thereto, and other parts than the lower lower back part P4 may be used as a reference part.

In addition, the configuration may be such that the setting information is omitted, and both of a pair of adjacent parts are rotated about a joint connecting the pair of parts, in a direction in which the parts are adjacent to each other or in a direction in which the parts are separated from each other.

In the above-described first and second embodiments, description is made using, as the posture of a person's image O, a posture where the person's image O stands with the body facing the front. However, according to the present invention, even in a posture where the person's image stands with one side of the body facing the front or a posture where the person's image sits with the body facing the front or with one side of the body facing the front, changed-image data where the way a joint or a junction between bones is bent is emphasized can be generated.

In addition, in the above-described first and second embodiments, a person is adopted as a subject. However, according to the present invention, even if the subject is an animal such as a dog or a cat, changed-image data where the way a joint or a junction between bones is bent is emphasized can be generated.

In the above-described first and second embodiments, when a special effect process (the processing item of "joint bend emphasis") is performed on image data, after the angle formed by a pair of adjacent parts is changed, an interpolation process for connecting the pair of parts or areas Ar1 and Ar2 in a natural form may be performed.

In addition, the above-described second embodiment may adopt a configuration in which, instead of the interpolation process, in order to cover a gap between areas An and Ar2 (see (f) to (h) of FIG. 15), rotated-image data where an image for the area Ar1 in finishing effect image data is rotated may be combined with finishing effect image data containing the areas Ar1 and Ar2, thereby generating composite image data.

Although in the above-described first and second embodiments the main body unit 2, 2A and the lens unit 3 are composed of separate units, the configuration is not limited thereto, and the main body unit 2, 2A and the lens unit 3 may be formed integrally.

In addition, the imaging apparatuses 1 and 1A according to the present invention can also be applied to, for example, digital cameras and digital video cameras to which accessories, etc., can be attached, and electronic devices such as mobile phones and tablet mobile devices having a shooting function, in addition to digital single-lens reflex cameras.

Furthermore, the processing order of the processing flows is not limited to that in the flowcharts described in the above-described first and second embodiments, and may be changed within a consistency range.

In addition, the processing algorithm described using the flowcharts in the present specification can be written as a program. Such a program may be recorded in a recording unit in a computer or may be recorded in a computer-readable recording medium. The recording of the program in the recording unit or the recording medium may be performed when the computer or the recording medium is shipped as a product, or may be performed by downloading through a communication network.

An imaging apparatus according to some embodiments divides a subject image contained in image data into a plurality of parts, and generates changed-image data in which the positional relationship between the plurality of parts is changed. Therefore, it is possible to change the posture of a subject image by image processing and create highly amusing images.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
an imaging unit that captures a subject to generate image data containing a subject image;
a part dividing unit that analyzes the image data and divides the subject image into a plurality of parts using position information related to a joint or a junction between bones;
a changed-image data generating unit that generates changed-image data in which a positional relationship between the plurality of parts is changed;
a display unit;
a display control unit that allows the display unit to display an avatar image representing the subject;
a touch panel that accepts a user operation that changes a positional relationship between a plurality of regions contained in the avatar image;
a positional relationship storage unit that stores positional relationship information related to the positional relationship between the plurality of regions changed according to the user operation;

an imaging control unit that allows a recording unit to record the image data, based on the positional relationship information and the positional relationship between the plurality of parts obtained by analyzing and dividing the image data by the part dividing unit;

an association information recording unit that records, as an angle formed by a pair of adjacent parts among the plurality of parts, association information in which first and second angles are associated with each other, the first angle being an angle before the positional relationship between the pair of adjacent parts is changed, and the second angle being an angle after the positional relationship between the pair of adjacent parts is changed; and an angle calculating unit that calculates an angle formed by the pair of adjacent parts among the plurality of parts, wherein the changed-image data generating unit generates the changed-image data in which the angle formed by the pair of adjacent parts among the plurality of parts is changed, based on the association information, to the second angle associated with the first angle corresponding to the angle calculated by the angle calculating unit.

2. An imaging apparatus comprising:

an imaging unit that captures a subject to generate image data containing a subject image;

a part dividing unit that analyzes the image data and divides the subject image into a plurality of parts using position information related to a joint or a junction between bones;

a changed-image data generating unit that generates changed-image data in which a positional relationship between the plurality of parts is changed;

a display unit;

a display control unit that allows the display unit to display an avatar image representing the subject;

a touch panel that accepts a user operation that changes a positional relationship between a plurality of regions contained in the avatar image;

a positional relationship storage unit that stores positional relationship information related to the positional relationship between the plurality of regions changed according to the user operation;

an imaging control unit that allows a recording unit to record the image data, based on the positional relationship information and the positional relationship between the plurality of parts obtained by analyzing and dividing the image data by the part dividing unit, wherein the part dividing unit analyzes a plurality of image data, each containing the subject image of which posture changes chronologically, and divides each subject image contained in each of the plurality of image data into a plurality of parts, the imaging apparatus further comprises a part identifying unit that identifies a pair of adjacent parts of which an angle changes chronologically, based on each of the plurality of parts, and the changed-image data generating unit generates the changed-image data in which the angle formed by the pair of adjacent parts identified by the part identifying unit is changed in a direction in which the posture changes chronologically.

3. The imaging apparatus according to claim 2, wherein the changed-image data generating unit generates the changed-image data in which an image area in each of the plurality of image data is divided into two areas and with respect to one of the two areas, the other of the two areas is rotated in a direction in which the posture changes chronologically, the one of the two areas including one of the pair of adjacent parts identified by the part identifying unit, and the other of the two areas including the other of the pair of adjacent parts identified by the part identifying unit.

4. An imaging apparatus comprising:

an imaging unit that captures a subject to generate image data containing a subject image;

a part dividing unit that analyzes the image data and divides the subject image into a plurality of parts using position information related to a joint or a junction between bones;

a changed-image data generating unit that generates changed-image data in which a positional relationship between the plurality of parts is changed;

a display unit;

a display control unit that allows the display unit to display an avatar image representing the subject;

a touch panel that accepts a user operation that changes a positional relationship between a plurality of regions contained in the avatar image;

a positional relationship storage unit that stores positional relationship information related to the positional relationship between the plurality of regions changed according to the user operation;

an imaging control unit that allows a recording unit to record the image data, based on the positional relationship information and the positional relationship between the plurality of parts obtained by analyzing and dividing the image data by the part dividing unit; and a setting information recording unit that records setting information in which one of a pair of adjacent parts among the plurality of parts is set as a fixed part of which position is fixed and the other of the pair of adjacent parts is set as a position change part of which position is to be changed, wherein the changed-image data generating unit generates the changed-image data in which a position of the position change part is changed with respect to the fixed part, based on the setting information.

5. An imaging method comprising:

capturing a subject to generate image data containing a subject image;

analyzing the image data thereby dividing the subject image into a plurality of parts using position information related to a joint or a junction between bones;

generating changed-image data in which a positional relationship between the plurality of parts is changed;

displaying an avatar image representing the subject;

storing, according to a user operation that changes a positional relationship between a plurality of regions contained in the avatar image, positional relationship information related to the changed positional relationship between the plurality of regions;

allowing a recording unit to record the image data, based on the positional relationship information and the positional relationship between the plurality of parts;

recording, as an angle formed by a pair of adjacent parts among the plurality of parts, association information in which first and second angles are associated with each other, the first angle being an angle before the positional relationship between the pair of adjacent parts is changed, and the second angle being an angle after the positional relationship between the pair of adjacent parts is changed; and calculating an angle formed by the pair of adjacent parts among the plurality of parts, wherein the changed-image data in which the angle formed by the pair of adjacent parts among the plurality of parts is changed, is generated based on the association information, to the second angle associated with the first angle corresponding to the angle calculated.

6. A non-transitory computer-readable recording medium with an executable program stored thereon, the program instructing an imaging apparatus to perform:

capturing a subject to generate image data containing a subject image;

analyzing the image data thereby dividing the subject image into a plurality of parts using position information related to a joint or a junction between bones;

generating changed-image data in which a positional relationship between the plurality of parts is changed;

displaying an avatar image representing the subject;

storing, according to a user operation that changes a positional relationship between a plurality of regions contained in the avatar image, positional relationship information related to the changed positional relationship between the plurality of regions;

allowing a recording unit to record the image data, based on the positional relationship information and the positional relationship between the plurality of parts;

recording, as an angle formed by a pair of adjacent parts among the plurality of parts, association information in which first and second angles are associated with each other, the first angle being an angle before the positional relationship between the pair of adjacent parts is changed, and the second angle being an angle after the positional relationship between the pair of adjacent parts is changed; and calculating an angle formed by the pair of adjacent parts among the plurality of parts, wherein the changed-image data in which the angle formed by the pair of adjacent parts among the plurality of parts is changed, is generated based on the association information, to the second angle associated with the first angle corresponding to the angle calculated.

* * * * *